(12) United States Patent
Horie

(10) Patent No.: US 11,853,489 B2
(45) Date of Patent: Dec. 26, 2023

(54) ELECTRONIC PEN OF CAPACITIVE SYSTEM, ELECTRONIC PEN CARTRIDGE OF CAPACITIVE SYSTEM, CHARGING TRAY FOR ELECTRONIC PEN, AND CHARGING TRAY FOR ELECTRONIC PEN CARTRIDGE

(71) Applicant: Wacom Co., Ltd., Saitama (JP)

(72) Inventor: Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/857,857

(22) Filed: Jul. 5, 2022

(65) Prior Publication Data
US 2022/0334660 A1 Oct. 20, 2022

Related U.S. Application Data

(63) Continuation of application No. PCT/JP2021/000740, filed on Jan. 13, 2021.

(30) Foreign Application Priority Data

Feb. 6, 2020 (JP) ................................. 2020-018708

(51) Int. Cl.
*G06F 3/0354* (2013.01)
*G06F 3/044* (2006.01)
(Continued)

(52) U.S. Cl.
CPC ........ *G06F 3/03545* (2013.01); *G06F 3/0383* (2013.01); *G06F 3/0441* (2019.05); *G06F 3/0442* (2019.05); *G06F 3/04162* (2019.05)

(58) Field of Classification Search
CPC ................ A01N 1/0221; A01N 1/0231; C12N 2533/54; C12N 5/0018; C12N 5/0068;
(Continued)

(56) References Cited

U.S. PATENT DOCUMENTS 10,768,723 B2 * 9/2020 Katsurahira ............ G06F 3/046
11,269,468 B2 * 3/2022 Yamamoto ............ G06F 3/0338
(Continued)

FOREIGN PATENT DOCUMENTS

JP 5687398 B1 3/2015
WO 2014/097953 A1 6/2014

OTHER PUBLICATIONS

International Search Reported, dated Mar. 23, 2021, for International Application No. PCT/JP2021/000740, 4 pages.

*Primary Examiner* — Chun-Nan Lin
(74) *Attorney, Agent, or Firm* — Seed IP Law Group LLP

(57) ABSTRACT

An electronic pen of a capacitive system includes a tubular pen casing, which houses an electronic circuit including a signal transmitting circuit that generates a signal to be supplied to a position detecting sensor and which houses a power storage device that provides a supply voltage to the electronic circuit and is chargeable. The electronic pen further includes a first conductor part and a second conductor part that are disposed to be exposed to outside to contactlessly form electric field coupling with power transmitting electrodes of a power transmitting part of an external charging device, to operate as power receiving electrodes. The electronic circuit includes a charging circuit that allows charging of the power storage device by being connected to the first conductor part and the second conductor part, and at least one of the first and second conductor parts is configured by part of the pen casing.

19 Claims, 12 Drawing Sheets

(51) Int. Cl.
*G06F 3/041* (2006.01)
*G06F 3/038* (2013.01)

(58) Field of Classification Search
CPC .. C12N 5/0607; C12N 5/0656; C12N 5/0693; G06F 3/03545; G06F 3/0383; G06F 3/04162; G06F 3/0441; G06F 3/0442
See application file for complete search history.

(56) References Cited

U.S. PATENT DOCUMENTS

| | | | |
|---|---|---|---|
| 11,392,225 B2* | 7/2022 | Park | G06F 3/0383 |
| 11,429,207 B2* | 8/2022 | Ninomiya | G06F 3/04162 |
| 11,644,912 B2* | 5/2023 | Hornung | G06F 3/0393 |
| | | | 345/174 |
| 2015/0130772 A1 | 5/2015 | Katsurahira | |
| 2017/0322643 A1* | 11/2017 | Eguchi | G06F 3/04162 |
| 2017/0357340 A1* | 12/2017 | Kamiyama | G06F 3/046 |
| 2018/0181223 A1* | 6/2018 | Yamada | B43K 29/08 |
| 2018/0299977 A1* | 10/2018 | Ogata | B43K 29/08 |
| 2018/0314349 A1* | 11/2018 | Jiang | G06F 3/03545 |
| 2019/0025952 A1 | 1/2019 | Aoki et al. | |
| 2020/0379584 A1* | 12/2020 | Ito | G06F 3/038 |
| 2021/0263613 A1* | 8/2021 | Hashimoto | G06F 3/04166 |
| 2022/0261098 A1* | 8/2022 | Aoki | G06F 3/038 |

* cited by examiner

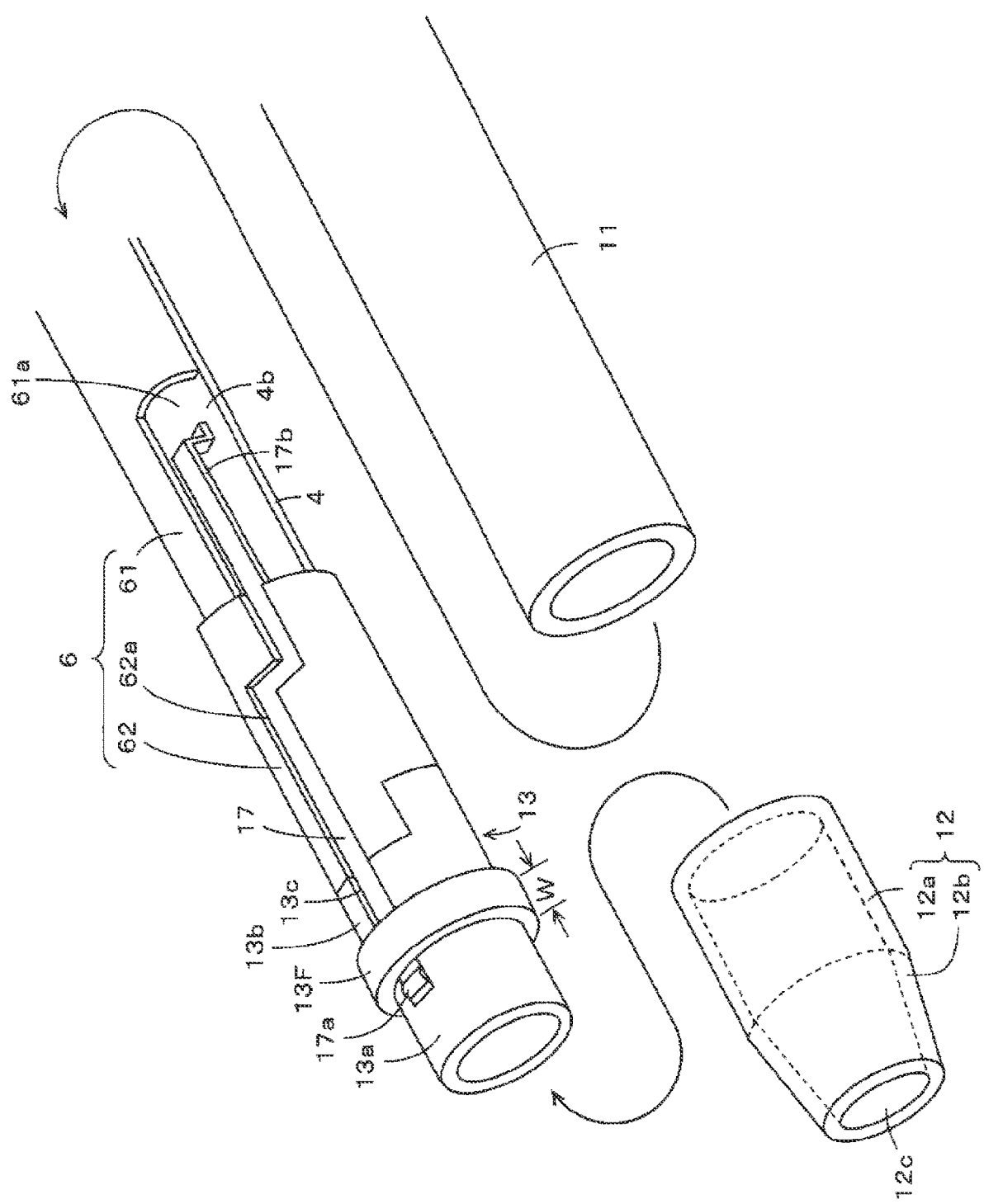
F I G. 2

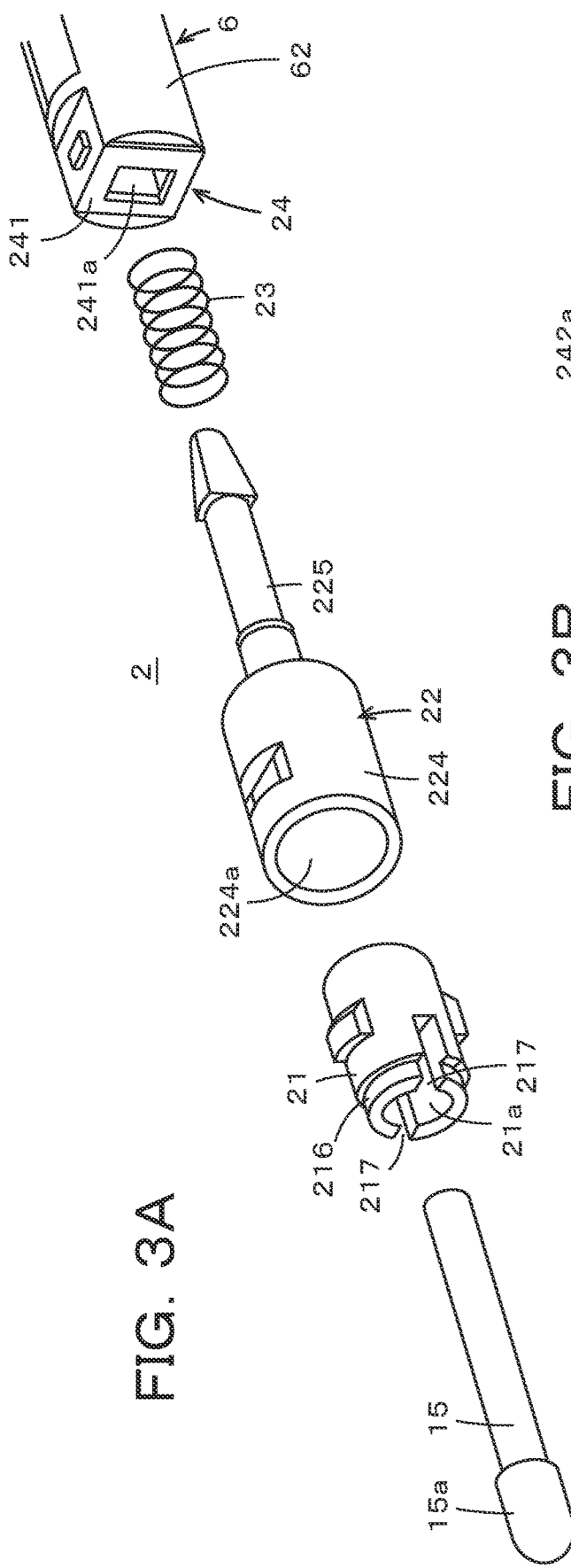
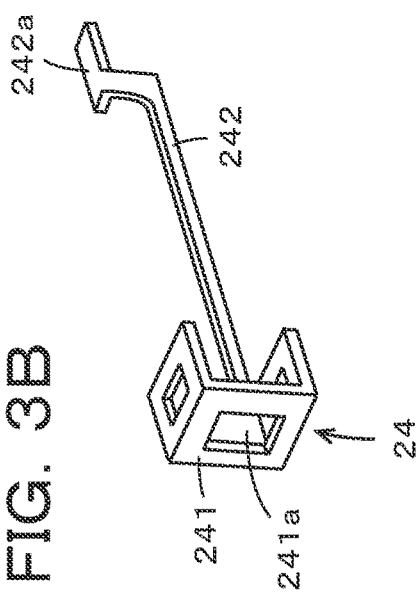
FIG. 3A
FIG. 3B

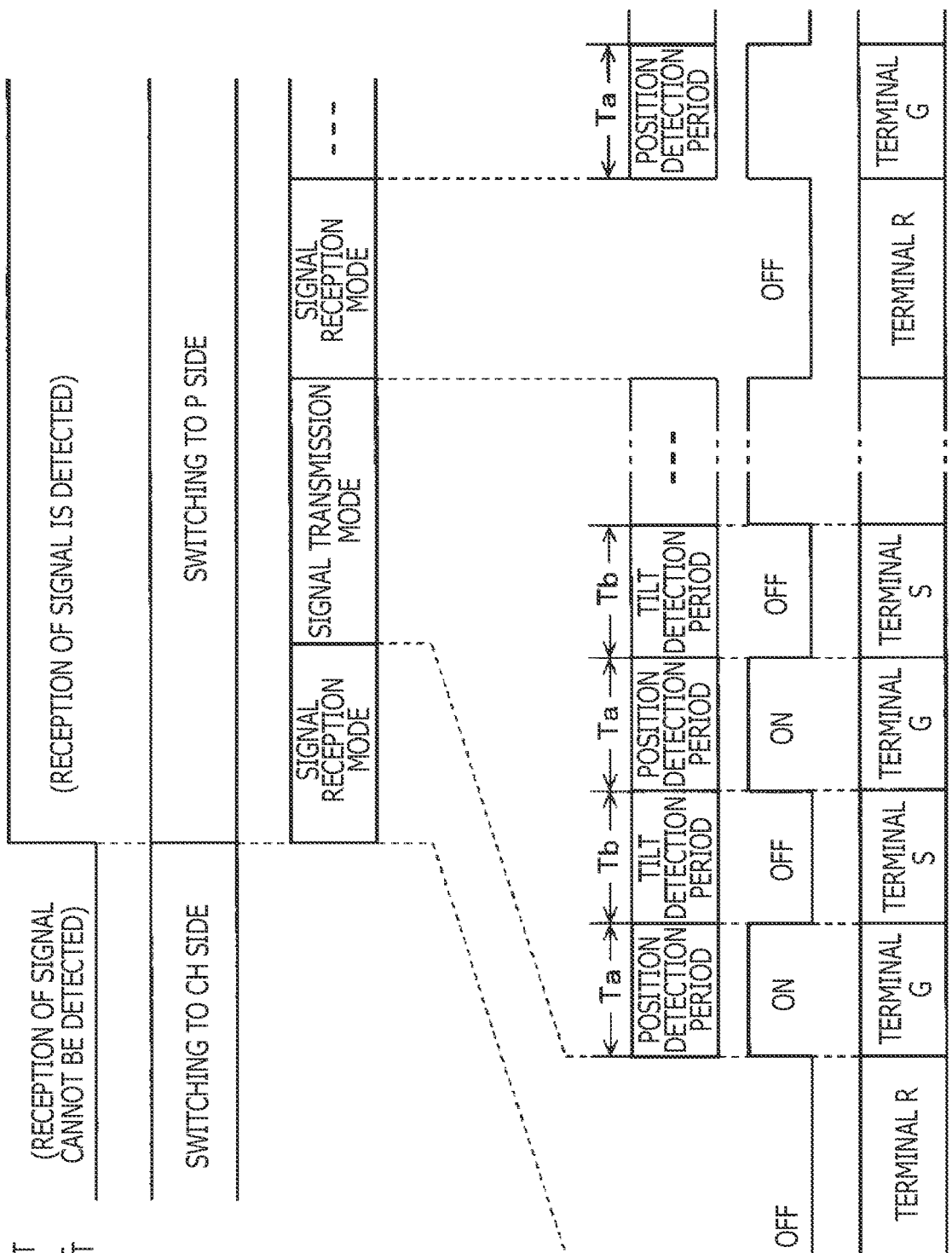

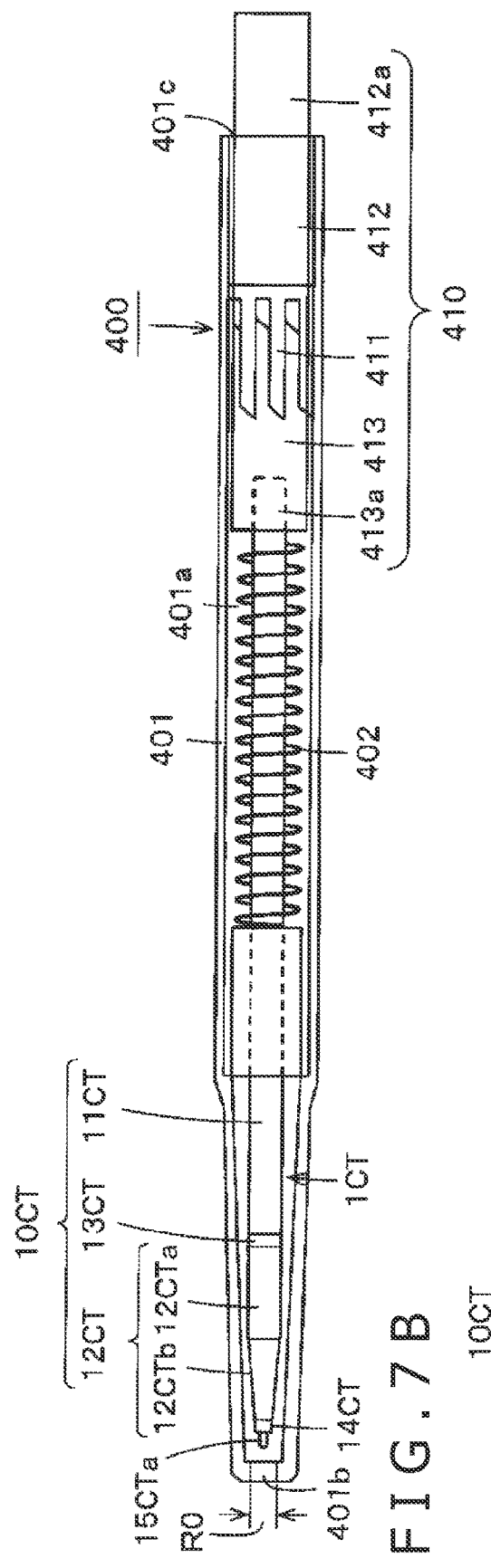
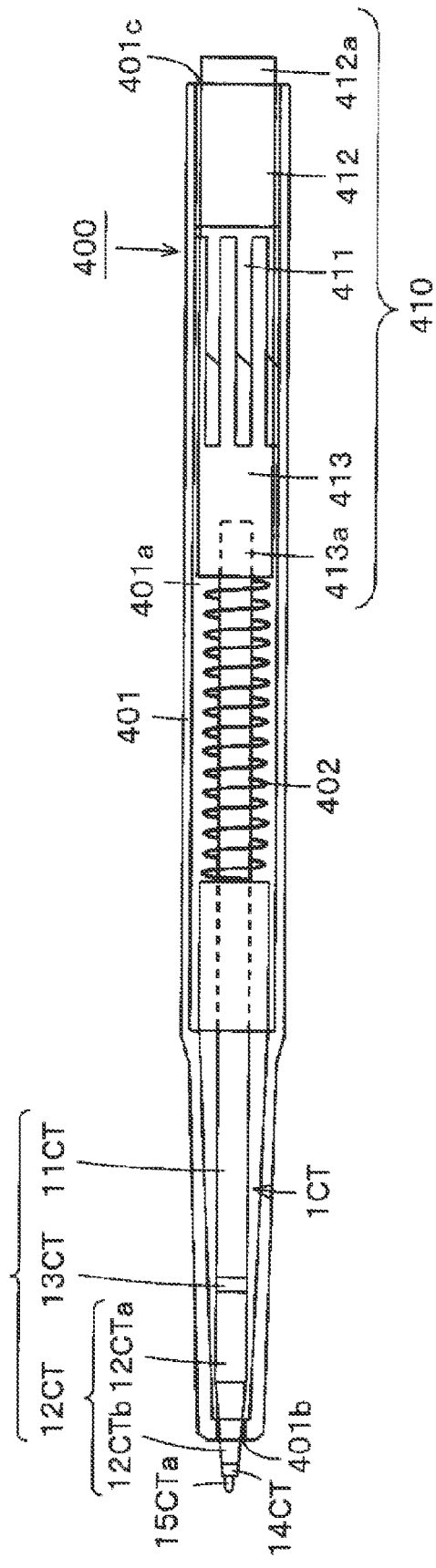
F I G. 7A
F I G. 7B

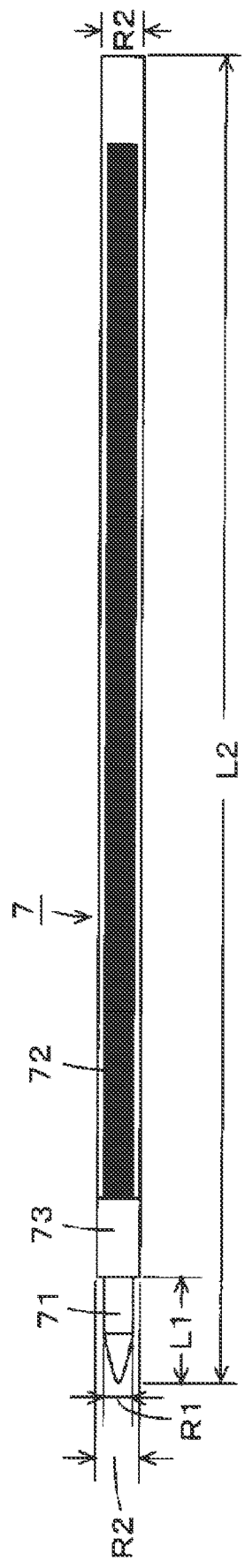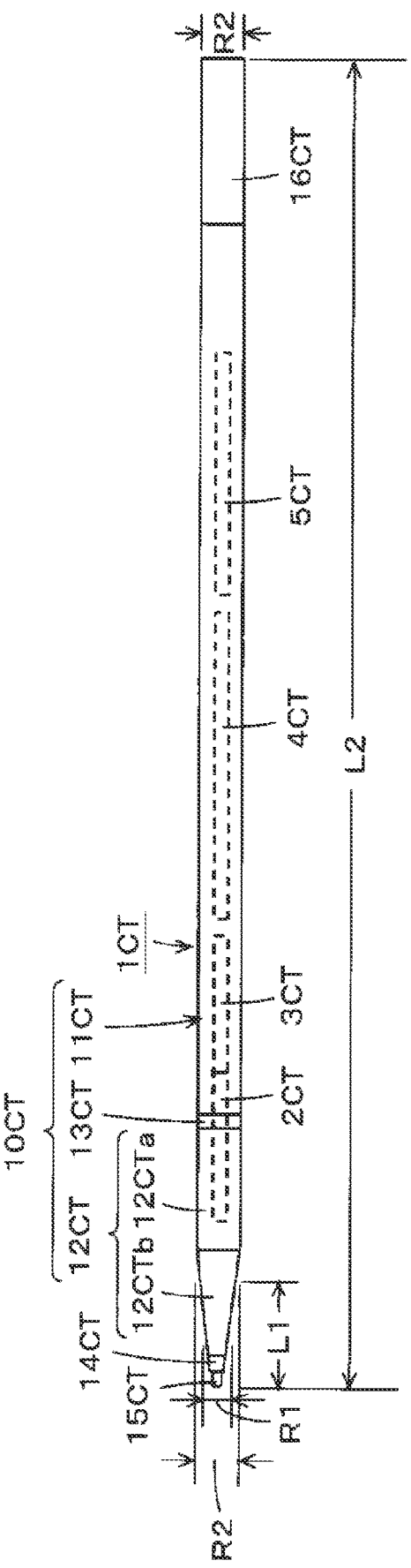

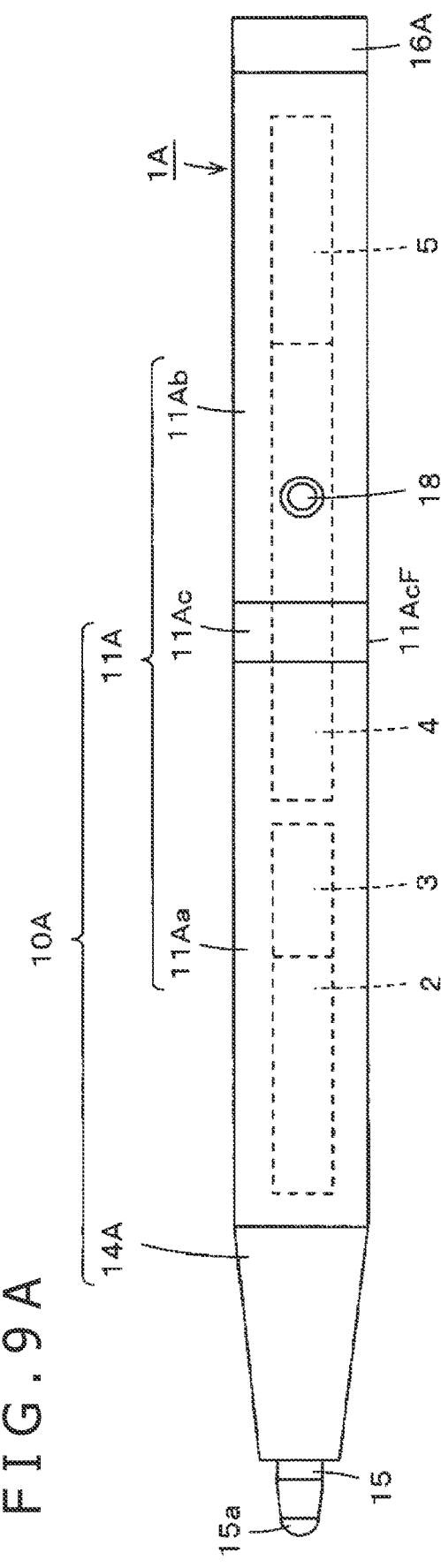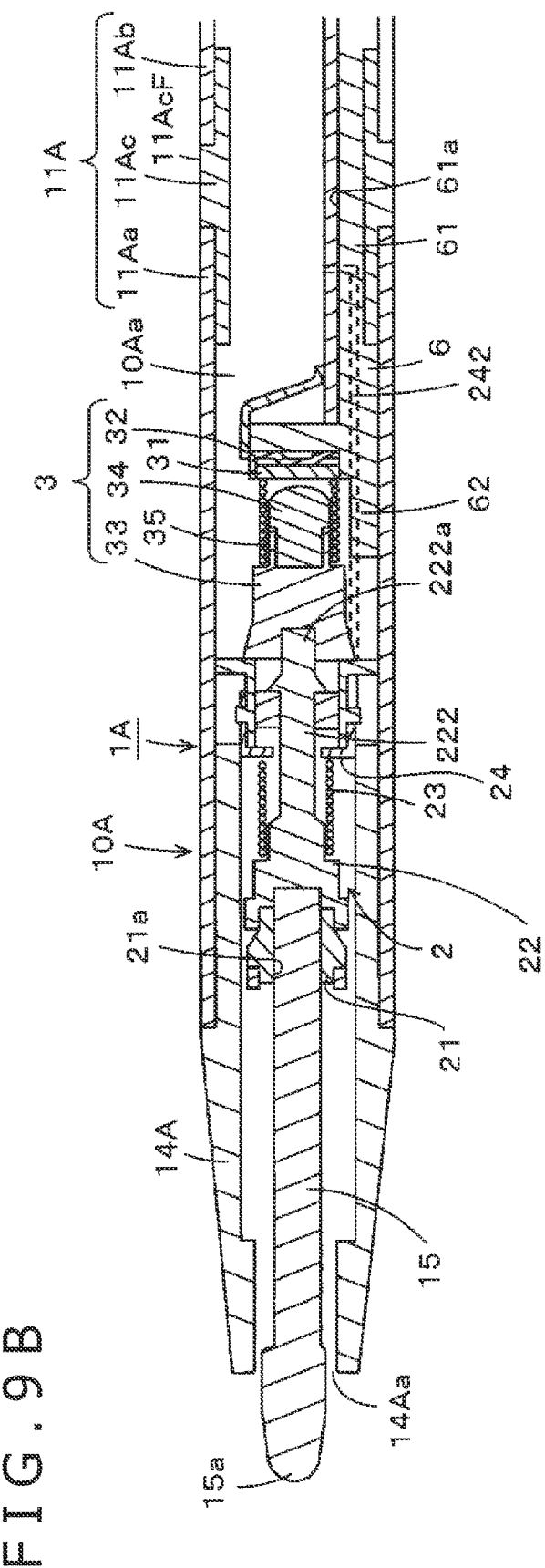
FIG. 9A
FIG. 9B even number of parts increases and the pen casing needs to be made into a special configuration, leading to an increase in cost.

Regarding this point, the electronic pen of Patent Document 2 does not require an electrode for charging purposes to be disposed in such a manner as to be exposed to the external from the pen casing, and therefore, the above-described problem does not exist.

However, as an electronic pen of the active capacitive system, there is also an electronic pen of a bidirectional communication type of such a type that a central rod is used as a center electrode, a peripheral electrode is disposed to surround the center electrode, and signals are communicated with a position detecting sensor by the center electrode and the peripheral electrode. In the electronic pen of the active capacitive system in Patent Document 2, the electrically-conductive central rod needs to be configured to be inserted through the through-hole of the ferrite core as described above. Thus, in the case of an electronic pen cartridge of the active capacitive system of the bidirectional communication type, the position of the peripheral electrode overlaps the position of the ferrite core around which the coil is wound, and therefore, thickness reduction is difficult.

Further, recently, the electronic pen has been seen as an extension of a writing implement, and there has also been a demand for the internal configuration thereof to be modularized and be allowed to be treated as in the case of a replacement ink tube (refill or cartridge) of a ballpoint pen. When this electronic pen cartridge is used, there is an advantage that it is also possible to utilize the casing of a ballpoint pen as a writing implement as it is. Hereinafter, in this specification, what is configured to be replaceable like a replacement ink tube of a ballpoint pen through modularization and integration of internal constituent parts of an electronic pen will be referred to as an electronic pen cartridge.

In this case, this electronic pen cartridge needs to have a thickness and a length equivalent to those of a replacement ink tube of a ballpoint pen. However, it is very difficult that the electrode for charging the power storage device housed in a cartridge casing is disposed in such a manner as to be allowed to be exposed from the cartridge casing. Thus, a configuration is also conceivable in which the electrode for charging is disposed on a pen casing and the power storage device of the electronic pen cartridge is charged by using the electrode for charging disposed on the pen casing. However, in this case, there is another problem that it is impossible to utilize the casing of a ballpoint pen as a writing implement as it is.

Furthermore, also when a system in which charging by use of electromagnetic induction action as in Patent Document 2 is carried out is employed as the charging system of the power storage device of the electronic pen cartridge, in the case of the electronic pen cartridge for the above-described electronic pen of the bidirectional communication type, the position of the peripheral electrode overlaps the position of the ferrite core around which the coil is wound, and therefore, it is difficult to allow the electronic pen cartridge to have such a thickness that allows compatibility with a replacement ink tube of a ballpoint pen as a writing implement.

ELECTRONIC PEN OF CAPACITIVE SYSTEM, ELECTRONIC PEN CARTRIDGE OF CAPACITIVE SYSTEM, CHARGING TRAY FOR ELECTRONIC PEN, AND CHARGING TRAY FOR ELECTRONIC PEN CARTRIDGE

BACKGROUND

Technical Field

This disclosure relates to an electronic pen of a capacitive system and an electronic pen cartridge of a capacitive system that carry out transfer of signals with a position detecting sensor by electric field coupling. Further, this disclosure relates to a charging tray for an electronic pen and a charging tray for an electronic pen cartridge.

Description of the Related Art

In an electronic pen of an active capacitive system, a signal transmitting circuit and a power supply that provides a supply voltage to this signal transmitting circuit are incorporated inside the pen. In addition, a central rod includes a conductor, and the electronic pen transmits a signal from the signal transmitting circuit from the conductor of the central rod to the position detecting sensor by capacitive coupling (for example, refer to Japanese Patent No. 5687398 (Patent Document 1)).

Due to preference for size reduction in recent years, demands for size reduction have increased also regarding portable electronic equipment. Thus, the electronic pen has come to be used with a position detecting sensor mounted in this kind of small-size electronic equipment, and pens having a thinner shape have become desirable.

In the case of using a primary cell (a primary battery) as a power supply of an electronic pen of the active capacitive system, there is a problem that a small-size dedicated primary cell made to meet preference for thickness reduction is required and that the need to frequently replace the primary cell arises.

Thus, a technique has been proposed in which a power storage device that can be charged, such as a secondary cell (a secondary battery) or an electric double-layer capacitor that allows size reduction, is used as a power supply of an electronic pen of the active capacitive system, and in which the configuration is made to allow the power storage device to be charged from outside.

For this purpose, on a pen casing of this kind of electronic pen of the active capacitive system, an electrode for charging is disposed to be allowed to be exposed to the external.

Further, the following electronic pen of the active capacitive system has also been proposed. A power storage device is disposed in a casing, and a member obtained by winding a coil around a ferrite core, as in an electronic pen of an electromagnetic induction system, is disposed on the pen tip side. The configuration is made in such a manner that the power storage device is charged by an electromagnetic induction current that flows in this coil due to an external magnetic field for charging (refer to WO2014/097953A1 (Patent Document 2)). In the electronic pen of the active capacitive system of Patent Document 2, an electrically-conductive central rod is configured to be inserted through a through-hole of the ferrite core.

However, the configuration in which the electrode for charging the power storage device is disposed on the pen casing of the electronic pen involves a problem that the

BRIEF SUMMARY

This disclosure intends to provide an electronic pen and an electronic pen cartridge that are capable of solving the above problems.

In order to solve the above-described problems, there is provided an electronic pen of a capacitive system in which an electronic circuit including a signal transmitting circuit that generates a signal to be supplied to a position detecting sensor is disposed in a tubular pen casing and in which a power storage device that provides a supply voltage to the electronic circuit and is allowed to be charged is disposed in the tubular pen casing. The electronic pen includes a first conductor part and a second conductor part that are disposed to be exposed to external in such a manner as to contactlessly make electric field coupling with power transmitting electrodes of a power transmitting part of an external charging device and to operate as power receiving electrodes. The electronic circuit includes a charging circuit that allows charging of the power storage device by being connected to the first conductor part and the second conductor part, and at least one of the first conductor part and the second conductor part is configured by part of the pen casing.

There is further provided an electronic pen cartridge of a capacitive system detachably housed in a tubular pen casing of an electronic pen such that at least a pen tip is capable of protruding from an opening of the pen casing on one side in an axial center direction. A tubular cartridge casing of the electronic pen cartridge includes an electronic circuit that includes a signal transmitting circuit configured to generate a signal to be supplied to a position detecting sensor, and a power storage device that provides a supply voltage to the electronic circuit and is capable of being charged. The electronic pen cartridge includes a first conductor part and a second conductor part that are disposed to be exposed to external in such a manner as to contactlessly make electric field coupling with power transmitting electrodes of a power transmitting part of an external charging device and to operate as power receiving electrodes. The electronic circuit includes a charging circuit that allows charging of the power storage device by being connected to the first conductor part and the second conductor part, and at least one of the first conductor part and the second conductor part is configured by part of the cartridge casing.

According to the electronic pen with the above-described configuration, the conductor parts of the tubular casing of the electronic pen operate as the power receiving electrodes that contactlessly make electric field coupling with the power transmitting electrodes of the external power transmitting part. Due to this, the power storage device in the casing of the electronic pen is charged by power transmitted from the external power transmitting part. Thus, according to the electronic pen with the above-described configuration, the power storage device in the casing can be charged without arranging an additional configuration to the tubular casing, such as arranging an electrode for charging or winding a coil in the case of electromagnetic induction. As a result, thickness reduction of the electronic pen of the active capacitive system can be readily achieved.

Similarly, according to the electronic pen cartridge with the above-described configuration, the conductor parts of the tubular cartridge casing of the electronic pen cartridge operate as the power receiving electrodes that contactlessly make electric field coupling with the power transmitting electrodes of the external power transmitting part. Due to this, the power storage device in the cartridge casing of the electronic pen cartridge is charged by power transmitted from the external power transmitting part. Thus, according to the electronic pen cartridge with the above-described configuration, the power storage device in the cartridge casing can be charged without arranging an additional configuration to the tubular cartridge casing, such as arranging an electrode for charging or winding a coil in the case of electromagnetic induction. As a result, it becomes easy to make a configuration that is compatible with a replacement ink tube of a ballpoint pen as a writing implement or the like.

BRIEF DESCRIPTION OF THE SEVERAL VIEWS OF THE DRAWINGS

FIG. 2 is a diagram for explaining a configuration example of part of the electronic pen of the first embodiment;

FIGS. 3A and 3B are diagrams for explaining a configuration example of part of the electronic pen of the first embodiment;

FIGS. 6A to 6F are diagrams illustrating timing charts used for explaining operation of the electronic pen of the first embodiment;

FIGS. 7A and 7B are diagrams for explaining a configuration example of a second embodiment of the electronic pen of this disclosure including an embodiment of an electronic pen cartridge according to this disclosure;

FIGS. 8A and 8B are diagrams for explaining a configuration example of the embodiment of the electronic pen cartridge according to this disclosure;

FIGS. 9A and 9B are diagrams for explaining a configuration example of a third embodiment of the electronic pen according to this disclosure;

DETAILED DESCRIPTION

Embodiments of an electronic pen of a capacitive system and an electronic pen cartridge of a capacitive system according to this disclosure will be described below with reference to the drawings.

First Embodiment

An electronic pen of a capacitive system according to a first embodiment is an example of the case of an electronic pen of a bidirectional communication type that receives a signal from the side of a position detecting sensor that detects a position indicated by the electronic pen and transmits a signal of a format based on a request included in the received signal.

In the case of this kind of electronic pen of the capacitive system of the bidirectional communication type, the signal transmitted from the position detecting sensor is based on an electric field that can be received by capacitive coupling, and the reaching distance thereof is very short. Thus, a receiving part of the electronic pen of the bidirectional communication type should be disposed at a position close to the pen tip such that the signal from the position detecting sensor can be received with high intensity.

Thus, in the first embodiment, in which a receiving part to receive a signal from a position detecting sensor is disposed in the electronic pen, the receiving part includes a peripheral electrode including a tubular conductor disposed to surround a center electrode in such a manner as to cover the center electrode in the vicinity of the tip part of the center electrode, while considering electrical insulation from a central rod as the center electrode including an electrically-conductive material.

Further, recently, a technique has been proposed in which the tilt angle of the electronic pen with respect to a position detecting sensor surface (an angle formed by an axial center direction of the electronic pen and the position detecting sensor surface, hereinafter abbreviated as the tilt angle of the electronic pen) is detected by a position detecting device and in which the detected tilt angle is reflected, for example, in the thickness of an indicated trace (writing trace) of the electronic pen. In the electronic pen of the first embodiment, the above-described peripheral electrode is configured to be utilized also for detection of the tilt angle of the electronic pen.

Further, in the first embodiment, the peripheral electrode is configured to also play a role as a shield electrode for the center electrode that transmits a signal for position detection.

Figure 1A:
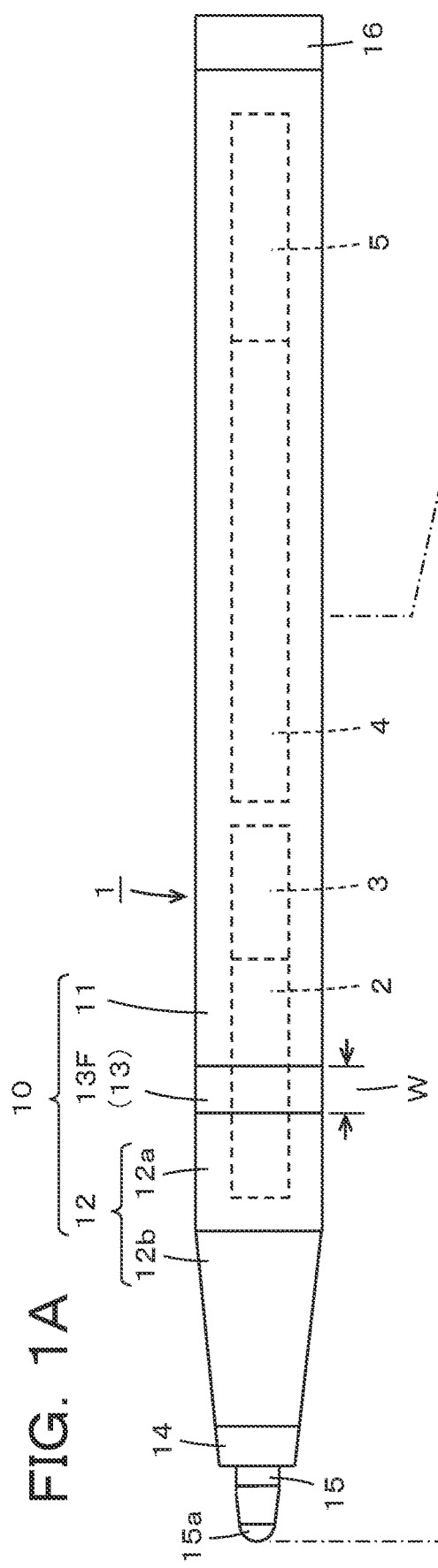
FIGS. 1A and 1B are diagrams for explaining a configuration example of a first embodiment of an electronic pen according to this disclosure.
Figure 1B:
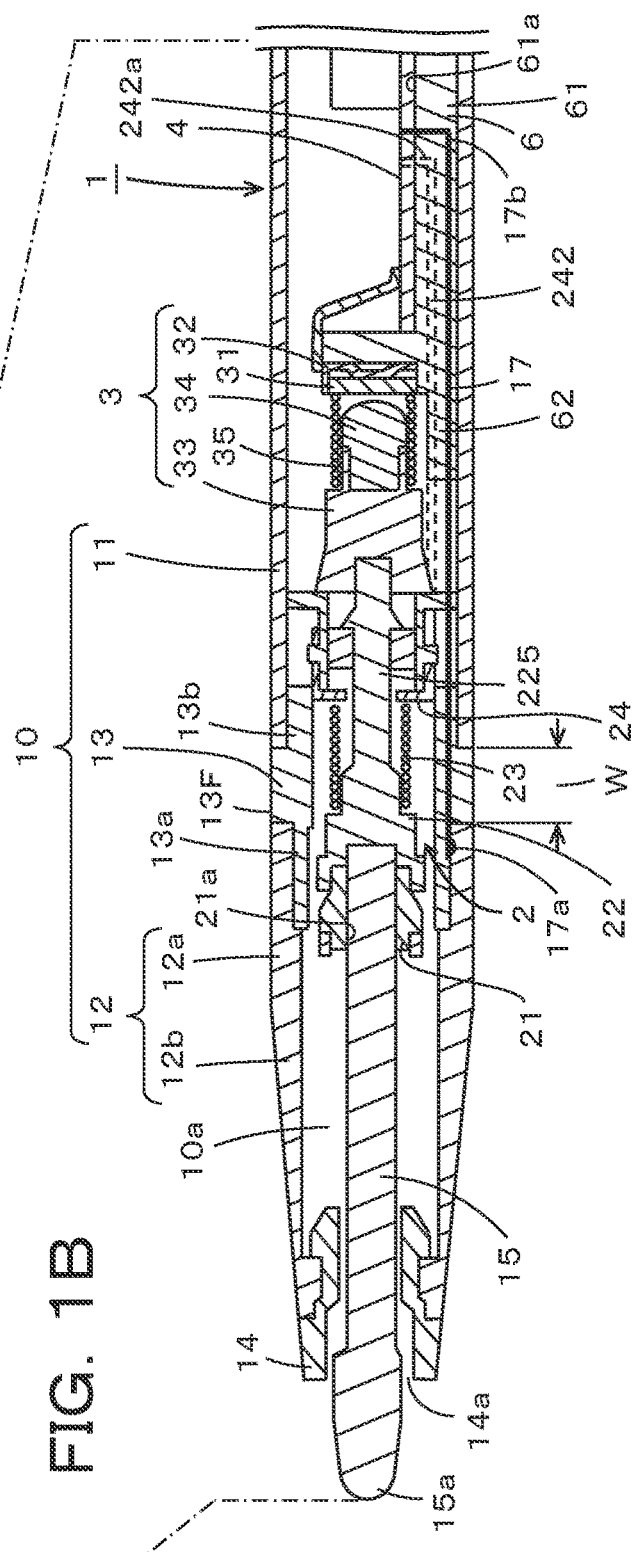

FIGS. 1A and 1B are diagrams for explaining a configuration example of the first embodiment of the electronic pen of the capacitive system. FIG. 1A is a diagram illustrating the appearance of an electronic pen 1 of the capacitive system in this embodiment. FIG. 1B is a longitudinal sectional view of the pen tip side thereof. Further, FIG. 2 is an exploded perspective view for explaining a configuration of a pen casing 10 of the electronic pen 1 of the capacitive system in the first embodiment.

In the electronic pen 1 of the first embodiment, the pen casing 10 is configured as follows. As illustrated in FIGS. 1A and 1B, a peripheral electrode 12 including an electrically-conductive material, for example, an electrically-conductive metal, is joined to the pen tip side of a casing tubular part 11 including an electrically-conductive material, for example, an electrically-conductive metal, with the interposition of a tubular joining member 13 including an insulating material, for example, a resin. Further, a front cap 14 is joined to the pen tip side of the peripheral electrode 12. The tubular joining member 13 plays a role of providing insulation between the casing tubular part 11 and the peripheral electrode 12.

In this example, as illustrated in FIGS. 1A and 1B and FIG. 2, the peripheral electrode 12 is made into a shape having a cylindrical shape part 12a in which the outer diameter is a constant diameter and a tapered part 12b formed into a tapered shape in such a manner as to be gradually tapered toward the pen tip side. In this example, as illustrated in FIGS. 1A and 1B and FIG. 2, the casing tubular part 11 has a cylindrical shape with an outer diameter equal to that of the cylindrical shape part 12a of the peripheral electrode 12. The front cap 14 is attached to the tapered tip of the tapered part 12b of the peripheral electrode 12.

The tubular joining member 13 has a tubular body like one illustrated in FIG. 1B and FIG. 2, and a ring-shaped flange part 13F that protrudes from an outer circumferential surface thereof is formed at a middle position in the axial center direction. The ring-shaped flange part 13F has a predetermined width W (see FIGS. 1A and 1B and FIG. 2) in the axial center direction, and its end surface is flush with the casing tubular part 11 and the peripheral electrode 12 without generating a step to form part of the pen casing 10 as illustrated in FIGS. 1A and 1B.

The pen tip side of the tubular joining member 13, which is one side in the axial center direction from the ring-shaped flange part 13F, is made into a first fitting tubular part 13a fitted to the cylindrical shape part 12a of the peripheral electrode 12. Moreover, the rear end side of the tubular joining member 13 in the axial center direction from the ring-shaped flange part 13F is made into a second fitting tubular part 13b fitted to the casing tubular part 11.

In the state in which the casing tubular part 11 and the peripheral electrode 12 are inserted and fitted to the tubular joining member 13 as illustrated by arrows in FIG. 2 and in which the front cap 14 is joined to an opening 12c (see FIG. 2) of the peripheral electrode 12 on the pen tip side, the pen casing 10 of one tubular body is formed as illustrated in FIG. 1A. At this time, as described above, an outer circumferential surface of the casing tubular part 11, an outer circumferential surface of the peripheral electrode 12, and the end surface of the ring-shaped flange part 13F of the tubular joining member 13 are in flush with one another. Further, the casing tubular part 11 and the peripheral electrode 12 each including an electrically-conductive material are not in contact and are electrically isolated (insulated) from each other due to the existence of the ring-shaped flange part 13F of the tubular joining member 13.

As illustrated in FIG. 1B, a hollow part 10a exists inside the pen casing 10. The front cap 14 mounted on the pen tip side of the peripheral electrode 12 includes an insulating material and has, on its tip side, an opening 14a (see FIG. 1B) having a diameter larger than that of a central rod 15 that forms the center electrode. The opening 14a communicates with the hollow part 10a of the pen casing 10.

As illustrated in FIG. 1B, the central rod 15 is inserted into the hollow part 10a of the pen casing 10 from the opening 14a of the front cap 14. The central rod 15 includes an electrically-conductive material, for example, an electrically-conductive metal, and is formed in a rod-like shape as illustrated in FIG. 1B. The central rod 15 is configured to be held by being detachably fitted into a central rod holding member 2 that is disposed in the pen casing 10 and that will be described later, in the state in which a tip part 15a of the central rod 15 protrudes to the external. Moreover, in this example, as illustrated in FIG. 1A, an opening of the casing tubular part 11 of the pen casing 10 on the rear end side, which is the side opposite to the pen tip side, is closed by a lid part 16 formed of, for example, a resin.

The central rod 15 and the peripheral electrode 12 each including an electrically-conductive material are electrically isolated (insulated) from each other by the front cap 14 that is an insulating material as illustrated in FIG. 1B. In the electronic pen 1 of the first embodiment, when the central rod 15 is mounted, the rear end side from the tip part 15a that becomes the pen tip of the central rod 15 is surrounded by the peripheral electrode 12 as illustrated in FIG. 1B.

In the hollow part 10a of the pen casing 10, as illustrated by dotted lines in FIG. 1A, the central rod holding member 2, a writing pressure detecting unit 3, a printed board 4 on which an electronic circuit including a signal transmitting circuit is mounted, and a capacitor 5 as an example of a power storage device for supply voltage provision to the electronic circuit are disposed to be lined up in the axial center direction and be housed sequentially from the pen tip side. A circuit for charging for supplying a charging current to the capacitor 5 is included in the electronic circuit mounted on the printed board 4. In this embodiment, as described later, the capacitor 5 is charged through receiving power transmitted from the external by a contactless power transmission system based on electric field coupling. In this example, the capacitor 5 is configured by an electric double-layer capacitor, for example.

Moreover, in the first embodiment, as illustrated in FIG. 1B, a board holder 6 in which the printed board 4 is placed on a board placement pedestal 61 is housed in the hollow part 10a of the pen casing 10.

The board holder 6 includes an insulating resin and has a writing pressure detecting unit holding part 62 for housing and holding the writing pressure detecting unit 3 on the side opposite to the side of the board placement pedestal 61 in a longitudinal direction that is the axial center direction of the electronic pen 1. The writing pressure detecting unit holding part 62 is made into a cylindrical shape having a hollow part, in which to house plural parts of the writing pressure detecting unit 3. The board placement pedestal 61 is made into a boat shape on which the printed board 4 is placed to be held, which is like the shape obtained by cutting a tubular body by substantially half along the axial center direction.

As illustrated in FIG. 1B, the board holder 6 is housed in the pen casing 10 in such a manner that the writing pressure detecting unit holding part 62 is set on the pen tip side. Further, the central rod holding member 2 that is fitted to the central rod 15 and holds the central rod 15 is joined to the writing pressure detecting unit 3 held by the writing pressure detecting unit holding part 62, so that the pressure (writing pressure) applied to the central rod 15 is transmitted to the writing pressure detecting unit 3.

In this embodiment, the outer diameter of the writing pressure detecting unit holding part 62 of the board holder 6 is selected to be equal to or slightly smaller than the inner diameter of the tubular joining member 13. Further, as illustrated in FIG. 2, through fitting of part of the writing pressure detecting unit holding part 62 of the board holder 6 to part of the second fitting tubular part 13b of the tubular joining member 13, the board holder 6 is subjected to position restriction so as not to move in the axial center direction in the pen casing 10.

As illustrated in FIG. 1B and FIGS. 3A and 3B, the central rod holding member 2 that holds the central rod 15 through fitting includes an electrically-conductive elastic member 21, a central rod holder 22, a coil spring 23, and a conductor terminal member 24. In this embodiment, as illustrated in FIG. 1B, the central rod 15 is fitted to the central rod holder 22 including an electrically-conductive material through the electrically-conductive elastic member 21 and thereby is joined to and held by the central rod holder 22. The central rod holding member 2 also plays a role as a member for transmitting the writing pressure applied to the central rod 15 to the writing pressure detecting unit 3.

Further, the pressure (writing pressure) applied to the central rod 15 is transmitted to the writing pressure detecting unit 3 through fitting of the central rod holder 22 into a holding member 33 of the writing pressure detecting unit 3 held by the writing pressure detecting unit holding part 62. In this case, the central rod holder 22 is normally biased toward the side of the central rod 15 with respect to the board holder 6 by the coil spring 23 as an example of an elastic member including an electrically-conductive material such as an electrically-conductive metal. The coil spring 23 forms, with the conductor terminal member 24, a member for electrical connection for transmitting a signal from the signal transmitting circuit of the electronic circuit disposed on the printed board 4 to the central rod 15.

FIG. 3A is an exploded perspective view of the central rod 15, the electrically-conductive elastic member 21, the central rod holder 22, the coil spring 23, the conductor terminal member 24, and the writing pressure detecting unit holding part 62 of the board holder 6.

The electrically-conductive elastic member 21 includes, for example, electrically-conductive rubber and is formed into a cylindrical shape having a through-hole 21a into which the end part of the central rod 15 on the side opposite to the tip part 15a is fitted. The part of the electrically-conductive elastic member 21 on the side of the central rod 15 is decreased in the outer diameter relative to the other part to be a thin wall part, and is made into a grasping part 216 that facilitates grasping of the central rod 15 by formation of slits 217 therein.

With this configuration, the central rod 15 is grasped by arc-shaped parts that are two thin wall parts between which the slits 217 are formed in the grasping part 216. Therefore, the central rod 15 is easily inserted and fitted into the grasping part 216 of the electrically-conductive elastic member 21. Further, the central rod 15 can easily be removed from the electrically-conductive elastic member 21 by pulling it with a predetermined force.

The central rod holder 22 includes an electrically-conductive material, for example, steel special use stainless (SUS), and includes a housing fitting part 224 having a recessed hole 224a in which the electrically-conductive elastic member 21 is housed and fitted, and a rod-shaped part 225 fitted into the holding member 33 of the writing pressure detecting unit 3 to be described later. The housing fitting part 224 and the rod-shaped part 225 are integrally formed to constitute the central rod holder 22.

The electrically-conductive coil spring 23 is mounted around the rod-shaped part 225 of the central rod holder 22 that houses the electrically-conductive elastic member 21 in the above-described manner. Thereafter, the rod-shaped part of the central rod holder 22 is fitted into the holding member 33 of the writing pressure detecting unit 3 held by the writing pressure detecting unit holding part 62 of the board holder 6.

In this case, in the electronic pen 1 of this embodiment, a transmission signal from the signal transmitting circuit of the electronic circuit formed on the printed board 4 needs to be supplied to the central rod 15. In this embodiment, a member for electrical connection is configured by the coil spring 23 that is disposed between the central rod holder 22 and the writing pressure detecting unit holding part 62 of the board holder 6 and that includes an electrically-conductive material, and the conductor terminal member 24 (see FIG. 3B) disposed on the writing pressure detecting unit holding part 62 of the board holder 6. By this member for electrical connection, electrical connection for signal supply from the signal transmitting circuit on the printed board 4 is implemented.

The conductor terminal member 24 includes a material having electrical conductivity, for example, SUS, and has an abutting plate part 241 that covers the side of an opening part of the writing pressure detecting unit holding part 62 of the board holder 6 and that has a through-hole 241a in which the rod-shaped part 225 of the central rod holder 22 is inserted as illustrated in FIGS. 3A and 3B. Further, the conductor terminal member 24 includes an extending part 242 that extends to the part of the board placement pedestal 61 across the part of the writing pressure detecting unit holding part 62 of the board holder 6. Moreover, in the state in which the conductor terminal member 24 is mounted on the writing pressure detecting unit holding part 62 of the board holder 6, as illustrated in FIG. 1B, a terminal part 242a at the tip of the extending part 242 that extends from the conductor terminal member 24 abuts against a conductor on a back surface side of the printed board 4 placed on the board placement pedestal 61 of the board holder 6 and is soldered thereto, for example. Due to this, the conductor terminal member 24 and the signal transmitting circuit disposed on the printed board 4 are electrically connected.

Further, the coil spring 23 elastically gets contact with the central rod holder 22 and abuts against and elastically gets contact with the abutting plate part 241 of the conductor terminal member 24. The coil spring 23 includes an electrically-conductive material, and the electrically-conductive elastic member 21 and the central rod holder 22 have electrical conductivity. Therefore, the electrically-conductive elastic member 21 fitted into the central rod holder 22 is electrically connected to the circuit part of the printed board 4 through the coil spring 23 and the conductor terminal member 24.

The central rod 15 is inserted and fitted, in the above-described manner, into the through-hole 21a of the electrically-conductive elastic member 21 fitted into the central rod holder 22 housed in the pen casing 10 as above, and the central rod 15 is held by the central rod holder 22 through the electrically-conductive elastic member 21. In this state, the central rod 15 is electrically connected to the signal transmitting circuit of the printed board 4, and the state is created in which a signal from the signal transmitting circuit is supplied to the central rod 15.

As illustrated in FIG. 1B, the writing pressure detecting unit 3 of this example has a well-known configuration including plural parts, i.e., a dielectric 31, a terminal member 32, the holding member 33, an electrically-conductive member 34, and an elastic member 35, and has a configuration of a capacitance-variable capacitor in which the capacitance changes according to the writing pressure applied to the central rod 15.

Next, description will be made about an electrical connection between the peripheral electrode 12 and the circuit part of the printed board 4.

Here, FIG. 2 illustrates the casing tubular part 11, the peripheral electrode 12, and the tubular joining member 13 when the board holder 6 is viewed from the side opposite to the board placement pedestal 61. As illustrated in this FIG. 2, in the outer circumferential surface of the tubular joining member 13, a recessed groove 13c is formed to extend from the first fitting tubular part 13a to the second fitting tubular part 13b while passing through a radially inner side of the ring-shaped flange part 13F in the direction along the axial center direction of the tubular joining member 13. Further, a recessed groove 62a continuous with the recessed groove 13c of the second fitting tubular part 13b is formed in a circumferential side surface of the writing pressure detecting unit holding part 62 of the board holder 6. Moreover, as illustrated in FIG. 2, a cutout part 61a is formed in the board placement pedestal 61 of the board holder 6, and the side of a back surface 4b of the placed printed board 4 is visible from the side of the cutout part 61a.

Further, as illustrated in FIG. 2, a connection terminal conductor 17 including an electrically-conductive material, in this example, an electrically-conductive metal, is disposed in the recessed groove 13c and the recessed groove 62a. In this case, the depth of the recessed groove 13c and the recessed groove 62a is set in such a manner that an upper surface of the connection terminal conductor 17 is located at a position lower than the outer circumferential surface of the second fitting tubular part 13b. Due to this, when the casing tubular part 11 is fitted to the second fitting tubular part 13b of the tubular joining member 13, an air layer exists between the upper surface of the connection terminal conductor 17 housed in the recessed groove 13c and the recessed groove 62a and an inner wall surface of the casing tubular part 11, electrically isolating (insulating) the upper surface and the inner wall surface from each other.

As illustrated also in FIG. 1B, an end part 17a of the connection terminal conductor 17 disposed in the recessed groove 13c on the side of the first fitting tubular part 13a of the tubular joining member 13 is disposed in such a manner that at least part of the end part 17a slightly bulges out relative to the outer circumferential surface of the first fitting tubular part 13a. Due to this, when the peripheral electrode 12 is fitted to the first fitting tubular part 13a of the tubular joining member 13, the end part 17a of the connection terminal conductor 17 surely contacts an inner wall of the peripheral electrode 12, and the peripheral electrode 12 and the connection terminal conductor 17 are electrically connected to each other.

Moreover, an end part 17b of the connection terminal conductor 17 that extends to the side of the printed board 4 is bent at the place of the cutout part 61a of the board holder 6 and is electrically connected to the side of the back surface 4b of the printed board 4. While diagrammatic representation is omitted, the end part 17b of the connection terminal conductor 17 is electrically connected to the circuit part on a front surface side of the printed board 4 through a through-hole.

The upper surface of the connection terminal conductor 17 may be covered by an insulating layer to further ensure insulation between the connection terminal conductor 17 and the casing tubular part 11.

Further, while diagrammatic representation is omitted in FIGS. 1A and 1B, the casing tubular part 11 including an electrically-conductive metal is also electrically connected to the electronic circuit formed on the printed board 4.

In the electronic pen 1 with the above-described configuration, not only the tip part of the central rod 15 but the peripheral electrode 12 configured to surround the central rod 15 forms electric field coupling with a position detecting sensor through capacitance. A position detecting device including the position detecting sensor is capable of detecting a position indicated by the electronic pen 1 in a detection region of the position detecting sensor and detecting the tilt of the electronic pen 1.

Charging of Capacitor 5 as Example of Power Storage Device of Electronic Pen of First Embodiment In the electronic pen 1 of the first embodiment, the capacitor 5 as an example of a power storage device housed in the pen casing 10 is charged by a charging method using a wireless power transmission technique based on electric field coupling.

Specifically, as described above, in the electronic pen 1 of the first embodiment, the pen casing 10 includes the electrically-conductive casing tubular part 11 and the electrically-conductive peripheral electrode 12. Thus, in the electronic pen 1 of the first embodiment, at the time of charging of the capacitor 5, the casing tubular part 11 and the peripheral electrode 12 are used as a power receiving electrode that receives power on the basis of electric field coupling, and on the basis of the power received by this power receiving electrode, the capacitor 5 is charged by using a charging circuit configured in the electronic circuit formed on the printed board 4.

Figure 4A:
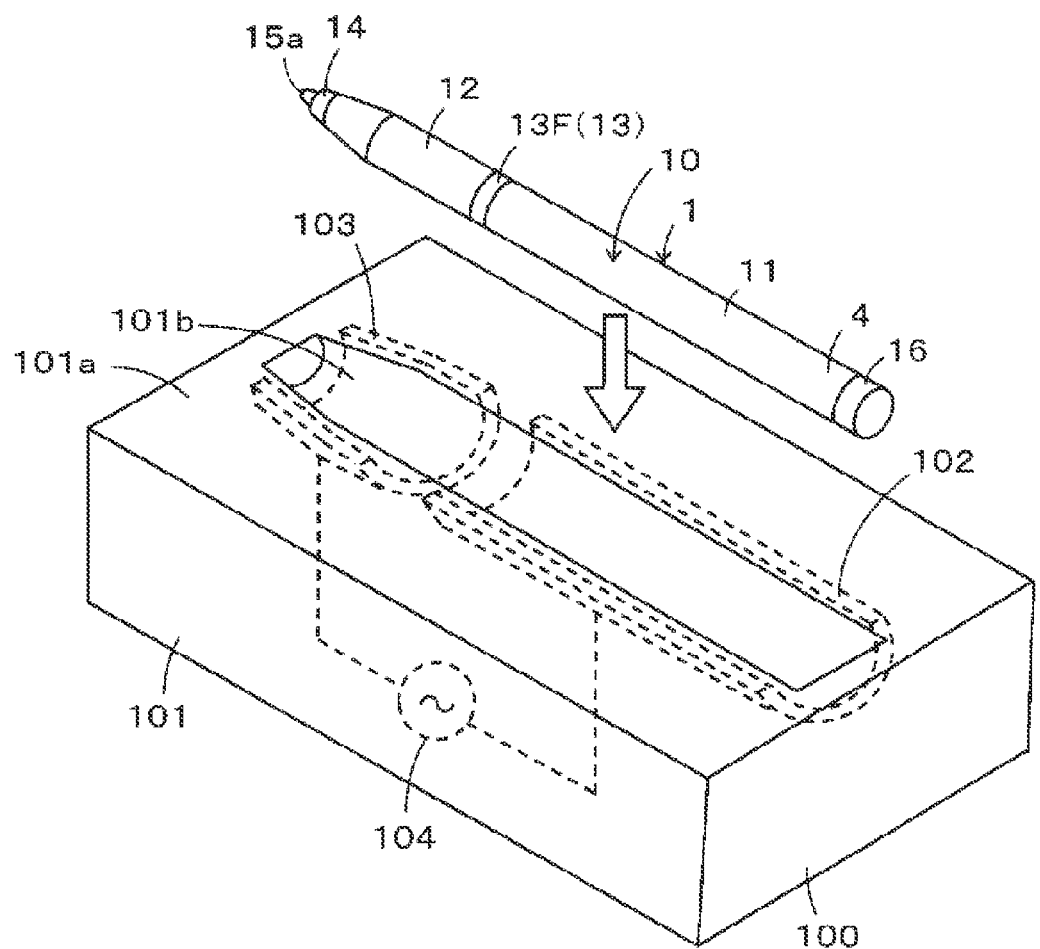
FIGS. 4A and 4B are diagrams for explaining a configuration example of an embodiment of a charging tray for the electronic pen according to this disclosure.
Figure 4B:
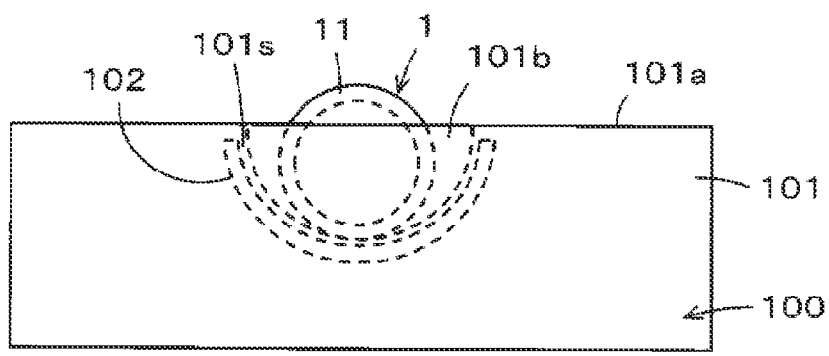

In this embodiment, a charging tray for the electronic pen with which wireless charging is enabled through placement of the electronic pen 1 thereon is used as a charging device. FIGS. 4A and 4B are diagrams illustrating one example of the charging tray for the electronic pen, together with the electronic pen 1. FIG. 4A is a perspective view obtained by viewing a charging tray 100 for the electronic pen in this example from an obliquely upper side. FIG. 4B is a side view of the charging tray 100 for the electronic pen in this example and is a diagram for explaining the state in which the electronic pen 1 is placed on the charging tray 100 for the electronic pen.

That is, the charging tray 100 for the electronic pen in the example of FIGS. 4A and 4B includes a tray casing 101 having, in this example, a rectangular parallelepiped shape with a thickness larger than the thickness of the pen casing 10 of the electronic pen 1. The tray casing 101 includes an insulating material, in this example, a resin. In this example, the length of an upper surface 101a of the tray casing 101 in a long-side direction is set longer than the length of the electronic pen 1 in the axial center direction, and the length in a short-side direction is set longer than the thickness of the electronic pen 1.

Further, in this example, as illustrated in FIG. 4A, at a central part of the upper surface 101a of the tray casing 101 in the short-side direction, a hollow 101b slightly longer than the length of the electronic pen 1 in the axial center direction is made along the long-side direction. The hollow 101b is for housing and placement of the electronic pen 1, and the width of the hollow 101b is set larger than the thickness of the electronic pen 1. However, the hollow 101b is made into a shape tailored to the shape of the pen tip side of the pen casing 10 of the electronic pen 1, and the width of one end side of the hollow 101b in the longitudinal direction on which the pen tip of the pen casing 10 of the electronic pen 1 is housed is set to gradually become smaller.

When a user attempts to charge the capacitor 5 of the electronic pen 1, in conformity with the shape of the hollow 101b of the charging tray 100 for the electronic pen, the user places the electronic pen 1 to house it in the hollow 101b in the state in which the pen tip side on which the peripheral electrode 12 is disposed is located on the one end side on which the width gradually becomes smaller in the hollow 101b as illustrated in FIG. 4A.

Inside the tray casing 101 of the charging tray 100 for the electronic pen, power transmitting electrodes 102 and 103 are disposed along the longitudinal direction of the hollow 101b. In this case, the power transmitting electrodes 102 and 103 are not exposed from a bottom surface of the hollow 101b, and a layer 101s (see FIG. 4B) formed of, for example, the resin that configures the tray casing 101 is inserted between the bottom surface and electrode surfaces of the power transmitting electrodes 102 and 103. Further, the power transmitting electrodes 102 and 103 are disposed in such a manner that, when the electronic pen 1 is placed to be housed in the hollow 101b, the power transmitting electrode 102 faces the casing tubular part 11 of the electronic pen 1 via the interposition of the resin layer 101s, and the power transmitting electrode 103 faces the peripheral electrode 12 of the electronic pen 1 via the interposition of the resin layer 101s.

The thickness of the layer 101s between the electrode surfaces of the power transmitting electrodes 102 and 103 and the bottom surface of the hollow 101b is selected to obtain appropriate intensity as the intensity of electric field coupling based on coupling capacitance Cm between the power transmitting electrodes 102 and 103 and the peripheral electrode 12 and the casing tubular part 11 that form power receiving electrodes of the electronic pen 1, and is set to one to several millimeters, for example.

Further, in the tray casing 101 of the charging tray 100, an alternating-current (AC) signal generating circuit 104 that supplies an AC current to be supplied to the power transmitting electrodes 102 and 103 is disposed in order to send out transmission power from the power transmitting electrodes 102 and 103.

The depth of the hollow 101b is set to a depth with which the intensity of electric field coupling between the casing tubular part 11 and the peripheral electrode 12 of the electronic pen 1 and the power transmitting electrodes 102 and 103 becomes appropriate intensity when the electronic pen 1 is placed in the hollow 101b.

While diagrammatic representation is omitted in FIGS. 4A and 4B, the charging tray 100 for the electronic pen is connected to an AC plug fitted into an electrical outlet of a commercial AC power supply and includes a power switch.

To carry out charging of the electronic pen 1 by using the charging tray 100 for the electronic pen configured as above, the electronic pen 1 is placed in the hollow 101b of the charging tray 100 for the electronic pen, and the power switch is turned on. Thereupon, a supply voltage is provided to the AC signal generating circuit 104, and an AC signal from the AC signal generating circuit 104 flows into the power transmitting electrodes 102 and 103, so that the transmission power is transmitted by electric field coupling between the casing tubular part 11 and the peripheral electrode 12 of the electronic pen 1 placed and housed in the hollow 101b and the power transmitting electrodes 102 and 103.

In the electronic pen 1, based on the power received by the casing tubular part 11 and the peripheral electrode 12, the capacitor 5 as an example of the power storage device is charged by the charging circuit of the electronic circuit. Due to this charging, the electronic pen 1 becomes operable as the electronic pen of the active capacitive system.

The charging device for the electronic pen is not limited to the tray-like example of FIGS. 4A and 4B and may be a charging device having other shapes such as a penholder in which the electronic pen is inserted, for example.

Figure 5:
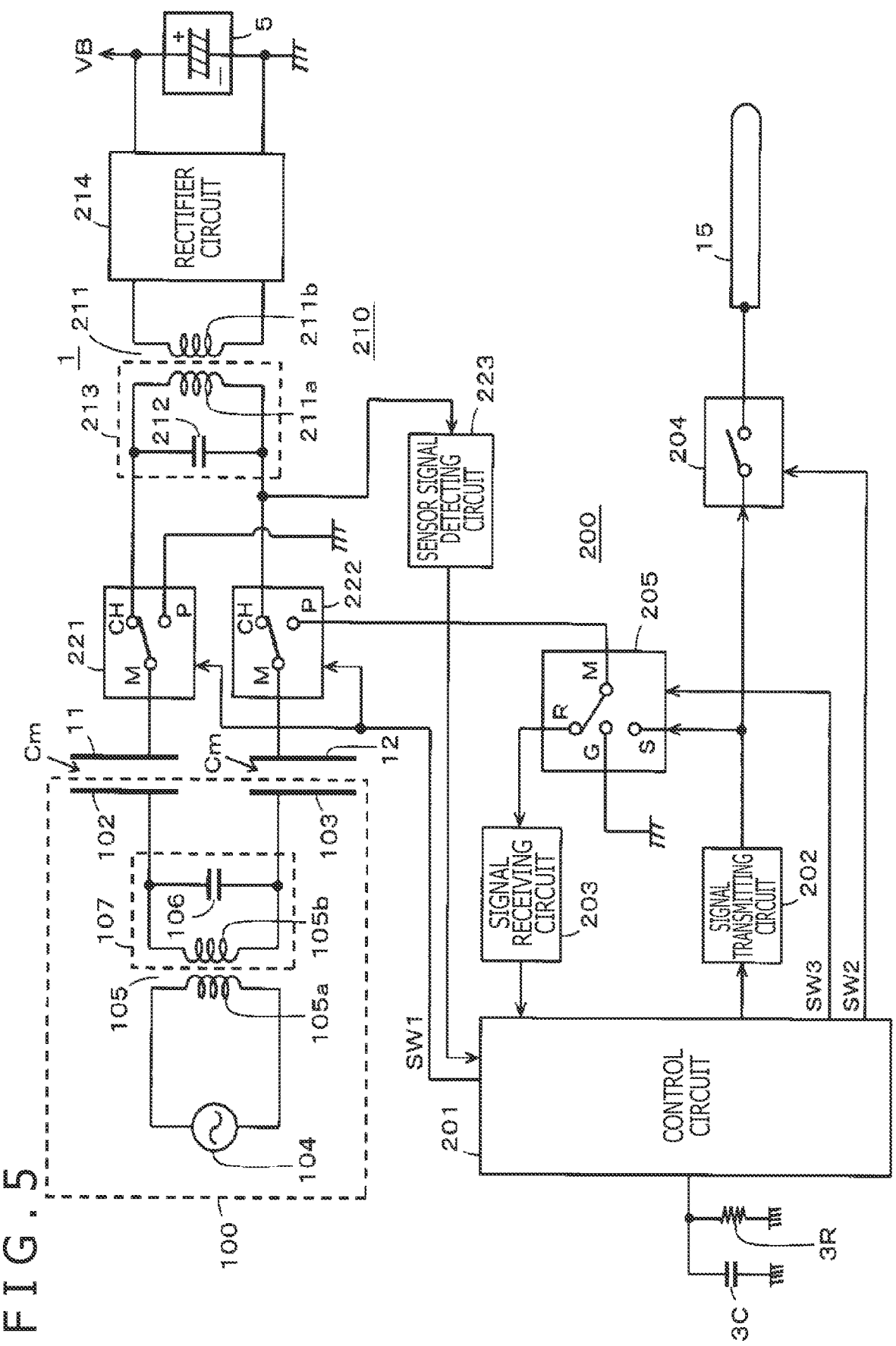
FIG. 5 is a diagram illustrating a circuit example of an electronic circuit of the electronic pen of the first embodiment and an electronic circuit of the charging tray.

Configuration Example of Electronic Circuit of Electronic Pen 1 of First Embodiment and Electrical Configuration Example of Charging Tray 100 for Electronic Pen Next, a configuration example of the electronic circuit of the electronic pen 1 of the first embodiment is illustrated in FIG. 5 together with an electrical configuration example of the charging tray 100 for the electronic pen.

In the electronic pen 1 of the first embodiment, the electronic circuit includes an electronic pen circuit 200 that carries out transfer of signals with a position detecting sensor and a charging circuit 210 of the capacitor 5 as illustrated in FIG. 5.

In this example, as illustrated in FIG. 5, the electronic pen circuit 200 includes a control circuit 201 configured by an integrated circuit (IC) placed on the printed board 4. In the electronic pen circuit 200, to the control circuit 201, a signal transmitting circuit 202 and a signal receiving circuit 203 are connected, and a variable-capacitance capacitor 3C configured by the writing pressure detecting unit 3 is connected. A resistor 3R is connected in parallel to the variable-capacitance capacitor 3C.

A signal output end of the signal transmitting circuit 202 is connected to the central rod 15 through a switch circuit 204. The switch circuit 204 is on/off-controlled by a switching control signal SW2 from the control circuit 201. In this case, the conductor terminal member 24, the central rod holder 22, and the electrically-conductive elastic member 21 are inserted in an electrical connection path between the central rod 15 and the switch circuit 204 as described above.

Further, in this embodiment, the casing tubular part 11 of the pen casing 10 is connected to a movable terminal M of a changeover switch circuit 221, and the peripheral electrode 12 is connected to a movable terminal M of a changeover switch circuit 222. In this case, the peripheral electrode 12 is connected to a changeover switch circuit 205 through the connection terminal conductor 17.

The changeover switch circuits 221 and 222 each have a fixed terminal CH and a fixed terminal P, and in this embodiment, are selectively switched between the state in which the movable terminal M is connected to the fixed terminal CH and the state in which the movable terminal M is connected to the fixed terminal P by a switching control signal SW1 to be described later from the control circuit 201.

The fixed terminal CH of the changeover switch circuit 221 to which the casing tubular part 11 is connected is connected to the charging circuit 210, and the fixed terminal P of the changeover switch circuit 221 is connected to an earth terminal (ground electrode) common to the electronic pen circuit 200. Further, the fixed terminal CH of the changeover switch circuit 222 to which the peripheral electrode 12 is connected is connected to the charging circuit 210, and the fixed terminal P of the changeover switch circuit 222 is connected to a movable terminal M of the changeover switch circuit 205 of the electronic pen circuit 200.

Further, in this example, the signal output end of the signal transmitting circuit 202 is connected to a fixed terminal S of the changeover switch circuit 205. A fixed terminal R of the changeover switch circuit 205 is connected to an input end of the signal receiving circuit 203. Moreover, a fixed terminal G of the changeover switch circuit 205 is connected to the earth electrode (ground electrode). The control circuit 201 supplies the changeover switch circuit 205 with a switching control signal SW3 for switching the connection destination of the movable terminal M between the terminal S, the terminal R, and the terminal G.

In this embodiment, wireless power transmission based on electric field coupling by use of a circuit configuration of the parallel resonant type is carried out between the charging tray 100 for the electronic pen and the electronic pen 1, so that the capacitor 5 as the power storage device of the electronic pen 1 is charged.

Specifically, as illustrated in FIG. 5, one end and the other end of the AC signal generating circuit 104 of the charging tray 100 are connected to one end and the other end of a primary winding 105a of a transformer 105. A capacitor 106 is connected in parallel to a secondary winding 105b of the transformer 105, thereby forming a parallel resonant circuit 107. Further, one end of the parallel resonant circuit 107 is connected to the power transmitting electrode 102, and the other end of the parallel resonant circuit 107 is connected to the power transmitting electrode 103.

Meanwhile, in the charging circuit 210 of the electronic pen 1, a capacitor 212 is connected in parallel to a primary winding 211a of a transformer 211, thereby forming a parallel resonant circuit 213. Further, the fixed terminal CH of the changeover switch circuit 221 to which the casing tubular part 11 of the pen casing 10 of the electronic pen 1 is connected is connected to one end of the parallel resonant circuit 213, and the fixed terminal CH of the changeover switch circuit 222 to which the peripheral electrode 12 is connected is connected to the other end of the parallel resonant circuit 213. The resonant frequency of the parallel resonant circuit 213 is set to be equal to the resonant frequency of the parallel resonant circuit 107 of the charging tray 100.

Moreover, one end and the other end of a secondary winding 211b of the transformer 211 are connected to, for example, input ends of a rectifier circuit 214 that carries out full-wave rectification, and the capacitor 5 is connected between output ends of the rectifier circuit 214.

Further, in this embodiment, the fixed terminal CH of the changeover switch circuit 222 to which the peripheral electrode 12 is connected is connected also to a sensor signal detecting circuit 223. The sensor signal detecting circuit 223 has a function of monitoring and detecting a signal received by the peripheral electrode 12 from the position detecting sensor and supplies an output signal of a detection result thereof to the control circuit 201. The control circuit 201 generates the switching control signal SW1 for switching the changeover switch circuits 221 and 222, on the basis of the detection output of the sensor signal detecting circuit 223.

In this embodiment, the sensor signal detecting circuit 223 does not always monitor the signal received from the position detecting sensor but carries out the monitoring only in an intermittent signal reception monitoring period that repeats at a predetermined cycle. By causing the sensor signal detecting circuit to operate only in the intermittent signal reception monitoring period as above, consumption of the stored voltage of the capacitor 5 can be lowered.

Further, when the detection output from the sensor signal detecting circuit 223 is at a low level as illustrated in the former half of FIG. 6A, for example, and indicates that the signal from the position detecting sensor is not being received by the peripheral electrode 12, the control circuit 201 enters the state in which the changeover switch circuits 221 and 222 are each switched by the switching control signal SW1 to the side of the fixed terminal CH as illustrated in the former half of FIG. 6B.

Moreover, when the detection output from the sensor signal detecting circuit 223 is at a high level as illustrated in the latter half of FIG. 6A, for example, and indicates that reception of the signal from the position detecting sensor by the peripheral electrode 12 is detected, the control circuit 201 enters the state in which the changeover switch circuits 221 and 222 are each switched by the switching control signal SW1 to the side of the fixed terminal P as illustrated in the latter half of FIG. 6B.

Therefore, in a situation in which the electronic pen 1 does not receive the signal from the position detecting sensor (a situation in which the electronic pen 1 and the position detecting sensor do not make electric field coupling), in the electronic pen 1, the control circuit 201 switches the changeover switch circuit 221 and the changeover switch circuit 222 each to the side of the fixed terminal CH by the switching control signal SW1 generated based on the detection signal from the sensor signal detecting circuit 223. Thus, the casing tubular part 11 and the peripheral electrode 12 are connected to the charging circuit 210.

When the electronic pen 1 is placed to be housed in the hollow 101b of the charging tray 100 in the above-described manner in this state, the power transmitting electrode 102 and the power transmitting electrode 103 of the charging tray 100 and the casing tubular part 11 and the peripheral electrode 12 of the pen casing 10 of the electronic pen 1 form electric field coupling with each other through the coupling capacitance Cm as illustrated in FIG. 5.

Due to this, AC power generated by the AC signal from the AC signal generating circuit 104 of the charging tray 100 is transmitted from the power transmitting electrode 102 and the power transmitting electrode 103 to the casing tubular part 11 and the peripheral electrode 12 as power receiving electrodes of the electronic pen 1 through the coupling capacitance Cm. Then, in the electronic pen 1, the AC power transmitted to the casing tubular part 11 and the peripheral electrode 12 is rectified by the rectifier circuit 214 through the transformer 211, and the capacitor 5 is charged by the rectified output. Further, the voltage across the capacitor 5 is supplied as a supply voltage VB to each of the control circuit 201, the signal transmitting circuit 202, the signal receiving circuit 203, the switch circuit 204, the changeover switch circuit 205, and the sensor signal detecting circuit 223 in the electronic pen circuit 200.

On the other hand, when the electronic pen 1 is in a situation in which the electronic pen 1 receives the signal from the position detecting sensor (a situation in which the electronic pen 1 forms electric field coupling with the position detecting sensor), in the electronic pen 1, the control circuit 201 switches the changeover switch circuit 221 and the changeover switch circuit 222 each to the side of the fixed terminal P by the switching control signal SW1 generated based on the detection signal from the sensor signal detecting circuit 223. Thus, the casing tubular part 11 is connected to the earth electrode of the electronic pen circuit 200, and the peripheral electrode 12 is connected to the changeover switch circuit 205 of the electronic pen circuit 200. Since the user of the electronic pen 1 holds the casing tubular part 11 with a hand, the earth electrode of the electronic pen circuit 200 is connected to the ground (electrical earth) through the human body of the user, and the electronic pen 1 carries out stable operation.

At this time, due to the switching of the changeover switch circuit 222 to the side of the fixed terminal P, it becomes impossible to detect reception of the signal from the position detecting sensor in the sensor signal detecting circuit 223, and the detection output thereof becomes the low level indicating that the signal from the position detecting sensor is not being received by the peripheral electrode 12.

However, in this embodiment, even when the detection output from the sensor signal detecting circuit 223 changes from the high level to the low level, the control circuit 201 does not immediately switch each of the changeover switch circuits 221 and 222 to the side of the fixed terminal CH.

Specifically, in this embodiment, in the operating state of the electronic pen circuit 200 in which the changeover switch circuits 221 and 222 are each switched to the side of the fixed terminal P, the control circuit 201 carries out time-division control of the peripheral electrode 12 of the electronic pen circuit 200 between a signal reception mode in which the signal from the position detecting sensor is received and a signal transmission mode in which a signal is transmitted to the position detecting sensor as illustrated in FIG. 6C. In addition, the control circuit 201 enters the signal reception mode immediately after switching to the side of the fixed terminal P.

In the signal reception mode, as described later, the signal from the position detecting sensor received by the peripheral electrode 12 is detected in the signal receiving circuit 203, and the detection output thereof is supplied to the control circuit 201. Therefore, the control circuit 201 keeps the state in which the changeover switch circuits 221 and 222 are each switched to the side of the fixed terminal P by the switching control signal SW1.

Further, in this embodiment, when reception of the signal from the position detecting sensor is not detected over a period longer than the repetition cycle of the signal reception mode, for example, a period that is an integer multiple of the repetition cycle of the signal reception mode, the control circuit 201 controls the switching control signal SW1 to switch each of the changeover switch circuits 221 and 222 to the side of the fixed terminal CH. The purpose of this control is to keep the state in which the changeover switch circuits 221 and 222 each have been switched to the side of the fixed terminal P even if the user separates the electronic pen 1 from the position detecting sensor for only a short time when carrying out position indication by the electronic pen 1.

The state in which the changeover switch circuits 221 and 222 are each switched to the side of the fixed terminal P is the state in which electric field coupling is formed between the electronic pen 1 and the position detecting sensor and mutual interaction therebetween is possible. Therefore, the electronic pen circuit 200 carries out operation (referred to as electronic pen operation) to be described below. In response to this, in the position detecting device including the position detecting sensor, detection of the position indicated by the electronic pen 1 is carried out, and processing of writing pressure detection, tilt detection, and so forth is executed, while diagrammatic representation thereof is omitted.

As illustrated in FIG. 6E, in the signal reception mode, the electronic pen circuit 200 turns off the switch circuit 204 and does not carry out signal transmission from the central rod 15 as the center electrode. Also in the state in which the changeover switch circuits 221 and 222 are each switched to the side of the fixed terminal CH, the switch circuit 204 is turned off, and signal transmission from the central rod 15 is not carried out. The purpose of this control is to avoid wasteful consumption of power.

Further, in the signal reception mode, the control circuit 201 switches the changeover switch circuit 205 to the side of the fixed terminal R by the switching control signal SW3 as illustrated in FIG. 6F. Therefore, the signal receiving circuit 203 receives the signal from the position detecting sensor received by the peripheral electrode 12 through the changeover switch circuit 222 and the changeover switch circuit 205 and executes processing of demodulation and so forth according to the received signal to send the processing result to the control circuit 201.

In response to the signal from the signal receiving circuit 203, the control circuit 201 detects the reception of the signal from the position detecting sensor. In addition, the control circuit 201 analyzes the signal received from the position detecting sensor, determines specifications of the position detecting device as the communication counterpart, and sets the signal interaction timing with the position detecting sensor of the position detecting device as the communication counterpart, on the basis of the determination result. Further, the control circuit 201 controls the format of a signal to be output from the signal transmitting circuit 202 to match the specifications of the position detecting device as the communication counterpart and carries out interaction with the position detecting sensor at the set timing.

In this embodiment, as illustrated in FIG. 6D, in the period of the signal transmission mode, the control circuit 201 repeatedly carries out, multiple times, a position detection period Ta, in which a burst signal for position detection and writing pressure detection information are transmitted to the position detecting device side, and a tilt detection period Tb for detection of the tilt angle of the electronic pen 1, in a time-division manner.

In the position detection period Ta, the control circuit 201 turns on the switch circuit 204 by the switching control signal SW2 (FIG. 6E) and connects the movable terminal M of the changeover switch circuit 205 to the fixed terminal G by the switching control signal SW3 (FIG. 6F). Therefore, the peripheral electrode 12 is connected to the earth terminal.

Further, the control circuit 201 controls the signal transmitting circuit 202 to supply a signal, which includes a signal for position detection (a burst signal) having a predetermined frequency for position detection by the position detecting device, and includes writing pressure information according to the writing pressure detected by the writing pressure detecting unit 3, to the central rod 15 through the switch circuit 204, to thereby transmit the signal to the position detecting sensor by capacitive coupling. At this time, because the peripheral electrode 12 is connected to the earth terminal, the peripheral electrode 12 works as a shield electrode for the central rod 15 as the center electrode and prevents mixing of noise into the central rod 15.

Moreover, the control circuit 201 carries out operation of detecting the writing pressure on the basis of the capacitance of the variable-capacitance capacitor 3C configured by the writing pressure detecting unit 3 in the period in which the burst signal for position detection is transmitted from the signal transmitting circuit 202.

Then, the control circuit 201 converts the detected writing pressure to a digital signal of plural bits in this example and controls the signal transmitting circuit 202 to output the writing pressure information according to the digital signal from the signal transmitting circuit 202.

In the tilt detection period Tb, the control circuit 201 turns off the switch circuit 204 by the switching control signal SW2 (FIG. 6E) and controls the changeover switch circuit 205 to connect the movable terminal M to the fixed terminal S by the switching control signal SW3. Furthermore, in the tilt detection period Tb, the control circuit 201 controls the signal transmitting circuit 202 to generate a burst signal for detection of the tilt angle of the electronic pen 1 and cause the burst signal to be transmitted from the peripheral electrode 12. The position detecting device detects the distribution of the detection position of the signal from the peripheral electrode 12 in the position detecting sensor and detects the tilt of the electronic pen 1 from the detection result.

Effects of First Embodiment

As described above, according to the electronic pen 1 of the first embodiment, because of the configuration in which the power storage device housed in the pen casing 10 is charged by using the wireless power transmission technique based on electric field coupling and because of the configuration in which the casing tubular part 11 and the peripheral electrode 12 of the pen casing 10 of the electronic pen 1 of the capacitive system are used as the power receiving electrodes, the power storage device can be charged while thickness reduction of the electronic pen is maintained.

Further, according to the electronic pen 1 of the above-described first embodiment, the power storage device incorporated in the pen casing 10 of the electronic pen 1 can be charged by merely placing and housing the electronic pen 1 in the hollow corresponding to the shape of the pen casing in the charging tray that carries out charging by using the wireless power transmission technique based on electric field coupling. In this case, in the electronic pen 1 of the first embodiment, because the casing tubular part 11 and the peripheral electrode 12 of the pen casing 10 are used as the power receiving electrodes, a special configuration such as arranging an electrode terminal for charging is unnecessary for the pen casing 10. Thus, the configuration of the pen casing can be simplified.

Moreover, in the electronic pen 1 of the first embodiment, the changeover switch circuits 221 and 222 are provided for the casing tubular part 11 and the peripheral electrode 12 of the pen casing 10 and are switched between the charging-possible time, and the electronic pen use time in which interaction with the position detecting sensor is carried out as the electronic pen. Therefore, there is another effect that a special mechanical configuration of the electronic pen 1 is not necessary, and an existing configuration can be used as it is.

In addition, in the first embodiment, the changeover switch circuits 221 and 222 are automatically switched by the control circuit 201 on the basis of the detection output of the sensor signal detecting circuit 223 that detects whether or not reception of the signal from the position detecting sensor is possible. Therefore, the user can carry out charging by merely placing the electronic pen 1 on the charging tray 100 in a situation in which the electronic pen 1 is sufficiently separated from the position detecting sensor so as not to form electric field coupling therewith.

Further, while having a configuration of the electronic pen of the bidirectional communication type, the electronic pen 1 of the first embodiment employs, as the charging system, not the system in which charging is carried out by use of electromagnetic induction action as in Patent Document 2 but the system in which charging is carried out by using the wireless power transmission technique based on electric field coupling. Therefore, it is not necessary to wind a coil around the outer circumferential part of the pen casing, for example, and thus, it is easy to reduce the thickness of the electronic pen.

In the above-described first embodiment, the changeover switch circuits 221 and 222 are automatically switched based on the detection output of the sensor signal detecting circuit 223 in the electronic circuit of the electronic pen 1. However, needless to say, an operation button configured to be switched between the charging-possible time and the use time as the electronic pen may be disposed on the pen casing 10 of the electronic pen 1, and the user may carry out the switching operation. In this case, the sensor signal detecting circuit 223 is not disposed, and the control circuit 201 is configured to be capable of detecting the operation state of the operation button. In addition, the control circuit 201 is configured to switch each of the changeover switch circuits 221 and 222 to the side of the fixed terminal CH by the switching control signal SW1 when the operation button is operated by the user and switching operation of the electronic pen 1 to the charging mode is carried out.

Embodiment of Electronic Pen Cartridge and Electronic Pen of Second Embodiment

The above-described first embodiment is an example of the electronic pen. However, it is also possible to make a configuration of an electronic pen cartridge that can be detachably mounted in a pen casing.

With reference to FIGS. 7A and 7B and FIGS. 8A and 8B, description will be made below about an embodiment of the electronic pen cartridge, a configuration example of the electronic pen cartridge of this embodiment, and a configuration example of an electronic pen 400 of a second embodiment in which an electronic pen cartridge 1CT of this embodiment is mounted.

FIGS. 7A and 7B are diagrams illustrating the configuration example of the electronic pen 400 of the second embodiment in which the electronic pen cartridge 1CT of the embodiment is housed. As illustrated in FIGS. 7A and 7B, the electronic pen 400 of the second embodiment has a configuration of a knock system in which the electronic pen cartridge 1CT of the embodiment is detachably housed in a hollow part 401a of a pen casing 401 and in which the pen tip side of the electronic pen cartridge 1CT of the embodiment is caused to protrude from and retract into the side of an opening 401b on one end side of the pen casing 401 in the axial center direction by a knock cam mechanism unit 410.

The electronic pen cartridge 1CT of the embodiment to be described below has a size similar to that of a replacement ink tube of a knock-type ballpoint pen as a writing implement and has compatibility with the replacement ink tube of the ballpoint pen. Therefore, as the pen casing 401 of the electronic pen 400 of the second embodiment, a casing of the knock-type ballpoint pen as a writing implement can be used as it is.

FIG. 7A illustrates the state in which the entire electronic pen cartridge 1CT is housed in the hollow part 401a of the pen casing 401. FIG. 7B illustrates the state in which the pen tip side of the electronic pen cartridge 1CT protrudes from the opening 401b of the pen casing 401 by the knock cam mechanism unit 410. In the example of FIGS. 7A and 7B, the pen casing 401 of the electronic pen 400 includes a transparent synthetic resin and is illustrated such that the inside thereof is visible in a see-through manner.

The pen casing 401 and the knock cam mechanism unit 410 disposed in the pen casing 401 are made into a configuration of a well-known commercially-available knock-type ballpoint pen. In addition, the dimensions thereof are also configured to be the same as the knock-type ballpoint pen.

As illustrated in FIGS. 7A and 7B, the knock cam mechanism unit 410 is made into a well-known configuration in which a cam main body 411, a knock bar 412, and a rotor 413 are combined. The cam main body 411 is formed on an inner wall surface of the tubular pen casing 401. In the knock bar 412, an end part 412a is configured to protrude from an opening 401c of the pen casing 401 on a side opposite to the pen tip side such that knock operation by the user can be accepted. The rotor 413 includes a fitting part 413a to which an end part of the electronic pen cartridge 1CT on a side opposite to the pen tip side is fitted. The detailed configuration of the knock cam mechanism unit 410 and operation thereof are well known, and therefore, description thereof is omitted here.

Configuration Example of Electronic Pen Cartridge 1CT

As described below, the electronic pen cartridge 1CT of this embodiment is different from the electronic pen 1 of the first embodiment only in dimensions such as the length and the thickness, and the configuration thereof is similar to that of the electronic pen 1 of the first embodiment. In the following description of the electronic pen cartridge 1CT of the embodiment, a similar constituent part corresponding to the electronic pen 1 of the first embodiment is denoted by the same reference symbol with a suffix "CT" added thereto.

FIGS. 8A and 8B are diagrams illustrating the configuration example of the electronic pen cartridge 1CT of this embodiment in comparison with a replacement ink tube 7 of a commercially-available knock-type ballpoint pen. The electronic pen cartridge 1CT of this embodiment has an internal configuration similar to that of the electronic pen 1 illustrated in FIG. 1B, and therefore, diagrammatic representation thereof is omitted in FIGS. 8A and 8B.

As illustrated in FIG. 8A, the replacement ink tube 7 of the commercially-available knock-type ballpoint pen has a well-known configuration in which a pen tip part 71 having a ball disposed at a tip thereof and a tubular ink housing part 72 having a constant outer diameter are joined to each other and integrated by a tubular joining part 73 having a constant outer diameter. The pen tip part 71 has a tubular shape and has its tip side formed into a tapered shape. The maximum outer diameter thereof is set to R1 that is smaller than a diameter R0 of the opening 401b of the pen casing 401 of the electronic pen 400. The joining part 73 and the ink housing part 72 have the same outer diameter R2. The outer diameter R2 is set slightly larger than the maximum outer diameter R1 of the pen tip part 71, and R2=2.2 millimeters is satisfied, for example. The diameter R0 of the opening 401b of the pen casing 401 is set to have a relation of R1<R0<R2.

On the other hand, as illustrated in FIGS. 7A, 7B, and 8B, a casing (hereinafter, referred to as a cartridge casing) 10CT of the electronic pen cartridge 1CT of this embodiment is configured such that a peripheral electrode 12CT including an electrically-conductive material, for example, an electrically-conductive metal, is joined to the pen tip side of a casing tubular part 11CT with the interposition of a tubular joining member 13CT. A front cap 14CT is joined to the pen tip side of the peripheral electrode 12CT, similarly to the pen casing 10 of the electronic pen 1 of the first embodiment. Also in this example, the casing tubular part 11CT includes an electrically-conductive metal similarly to the casing tubular part 11 of the pen casing 10 of the electronic pen 1 of the first embodiment. However, not a lid part but a resin pipe part 16CT is joined to the rear end side of the casing tubular part 11CT of the cartridge casing 10CT of the electronic pen cartridge 1CT of this embodiment, and the resin pipe part 16CT becomes a part, in the electronic pen cartridge 1CT, to be fitted to the fitting part 413a in the pen casing 401 of the electronic pen 400.

In this example, as illustrated in FIGS. 8A and 8B, dimensions of the pen tip side of the electronic pen cartridge 1CT are set almost equal to dimensions of the pen tip side of the replacement ink tube 7 of the ballpoint pen. Specifically, the outer diameter of the casing tubular part 11CT of the cartridge casing 10CT is set equal to the outer diameter R2 of the ink housing part 72 and the joining part 73 of the replacement ink tube 7 of the commercially-available knock-type ballpoint pen. Further, in the peripheral electrode 12CT, the pen tip side from a middle position of its tapered shape part 12CTb in the axial center direction is configured to have a diameter equal to or smaller than the diameter R0 of the opening 401b of the pen casing 401 on the pen tip side.

Moreover, as illustrated in FIGS. 8A and 8B, the length from the tip part of a central rod 15CT to the position at which the outer diameter becomes the diameter R1 in the peripheral electrode 12CT is made almost equal to a length L1 of the pen tip part 71 of the replacement ink tube 7 of the commercially-available knock-type ballpoint pen in the axial center direction when the central rod 15CT is inserted and mounted in the electronic pen cartridge 1CT from an opening of the front cap 14CT. In addition, as illustrated in FIGS. 8A and 8B, the length (total length) of the electronic pen cartridge 1CT in the state in which the central rod 15CT is mounted therein is selected to be equal to a total length L2 of the replacement ink tube 7 of the ballpoint pen.

The electronic pen cartridge 1CT with the above configuration can be housed in the pen casing 401 by fitting the resin pipe part 16CT on the rear end side of the casing tubular part 11CT of the cartridge casing 10CT to the fitting part 413a of the rotor 413 of the knock cam mechanism unit 410.

Further, in the electronic pen 400 of this embodiment, the user presses down the end part 412a of the knock bar 412 when using the electronic pen 400 with the position detecting device. Thereupon, the electronic pen cartridge 1CT is locked to the state of FIG. 7B in the pen casing 401 by the knock cam mechanism unit 410, and in this state, the pen tip side of the electronic pen cartridge 1CT protrudes from the opening 401b of the pen casing 401. At this time, in the electronic pen cartridge 1CT, as illustrated in FIG. 7B, a tip part 15CTa of the central rod 15CT and part of the pen tip side of the tapered part 12CTb of the peripheral electrode 12CT protrude to the external from the opening 401b of the pen casing 401, so that the central rod 15CT and the peripheral electrode 12CT are capable of electric field coupling and interaction with the position detecting sensor.

After the use of the electronic pen 400 ends, the end part 412a of the knock bar 412 is pressed down again from the state of FIG. 7B. Thereupon, the lock state is released by the knock cam mechanism unit 410, and the position of the electronic pen cartridge 1CT in the pen casing 401 returns to the state of FIG. 7A by a spring 402 for return. At this time, the entirety of the electronic pen cartridge 1CT is housed in the hollow part 401a of the pen casing 401, and the tip part 15CTa of the central rod 15CT of the electronic pen cartridge 1CT is protected by the pen casing 401.

Further, in the electronic pen cartridge 1CT of this embodiment, the electrically-conductive metal part of the casing tubular part 11CT and the peripheral electrode 12CT in the cartridge casing 10CT operate as power receiving electrodes that form electric field coupling with power transmitting electrodes of a charging tray for the electronic pen cartridge through capacitive coupling.

When a capacitor 5CT as a power storage element disposed in the cartridge casing 10CT of the electronic pen cartridge 1CT of this embodiment is to be charged, the electronic pen cartridge 1CT is removed from the electronic pen 400 and is placed to be housed in a hollow formed in the charging tray for the electronic pen cartridge.

The charging tray for the electronic pen cartridge has a configuration similar to that of the charging tray 100 for the electronic pen illustrated in FIGS. 4A and 4B, and therefore, diagrammatic representation and detailed description thereof are omitted here. However, in the charging tray for the electronic pen cartridge, the size of the hollow 101b of the charging tray 100 for the electronic pen illustrated in FIGS. 4A and 4B is changed to a size according to the length and the thickness of the electronic pen cartridge 1CT. In addition, the power transmitting electrode 102 and the power transmitting electrode 103 are disposed so as to form electric field coupling with the electrically-conductive metal part of the casing tubular part 11CT and the peripheral electrode 12CT, respectively, in the cartridge casing 10CT.

Also in the electronic pen 400 of the second embodiment using the electronic pen cartridge 1CT of this embodiment, operation and effects similar to those of the electronic pen 1 of the first embodiment are obtained.

Third Embodiment

The above-described embodiments represent the case in which the present disclosure is applied to the electronic pen and the electronic pen cartridge of the bidirectional communication type. However, the present disclosure can also be applied to an electronic pen or electronic pen cartridge of a type that is not the bidirectional communication type.

A third embodiment to be described below is an example of an electronic pen of such non-bidirectional communication type.

FIGS. 9A and 9B are diagrams for illustrating a configuration example of an electronic pen 1A of the third embodiment. FIG. 9A is a diagram illustrating the appearance of the electronic pen 1A of a capacitive system in the third embodiment. FIG. 9B is a longitudinal sectional view of the pen tip side thereof. In the following description of the electronic pen 1A of the third embodiment, a part similar to that of the electronic pen 1 of the first embodiment is given the same reference symbol, and description thereof is omitted.

The electronic pen 1A of the third embodiment does not include the peripheral electrode 12 of the electronic pen 1 of the first embodiment. In the electronic pen 1A of the third embodiment, as illustrated in FIGS. 9A and 9B, a front cap 14A including an insulating material, for example, a resin, is joined to the pen tip side of a casing tubular part 11A to form a pen casing 10A of the electronic pen 1A. A lid part 16A is mounted on the rear end side of the casing tubular part 11A to close the rear end side similarly to the electronic pen 1 of the first embodiment.

In this case, as illustrated in FIGS. 9A and 9B, the front cap 14A has a size and a tapered shape similar to those of the part where the peripheral electrode 12 and the front cap 14 are joined to each other in the electronic pen 1 of the first embodiment, and is mounted on the pen tip side of the casing tubular part 11A.

Further, in the electronic pen 1A of the third embodiment, the casing tubular part 11A of the pen casing 10A is made into a configuration in which two metal pipe parts 11Aa and 11Ab including an electrically-conductive material, an electrically-conductive metal in this example, are coupled to each other with the interposition of a tubular joining member 11Ac including an insulating material, a resin in this example.

The tubular joining member 11Ac has a configuration similar to that of the tubular joining member 13 in the electronic pen 1 of the first embodiment. The tubular joining member 11Ac includes a ring-shaped flange part 11AcF and electrically insulates the metal pipe part 11Aa and the metal pipe part 11Ab coupled to each other with the interposition of the tubular joining member 11Ac, by using the ring-shaped flange part 11AcF.

Moreover, the configuration of a part housed in a hollow part 10Aa of the pen casing 10A in the electronic pen 1A of the third embodiment is similar to that of the electronic pen 1 of the first embodiment. In the hollow part 10Aa of the pen casing 10A, as illustrated by dotted lines in FIG. 9A, the central rod holding member 2, the writing pressure detecting unit 3, the printed board 4 on which the electronic circuit including the signal transmitting circuit is mounted, and the capacitor 5 as an example of the power storage device to provide supply voltage to the electronic circuit are disposed to be lined up in the axial center direction and be housed sequentially from the pen tip side. In addition, similarly to the electronic pen 1 of the first embodiment, the central rod 15 is inserted from an opening 14Aa of the front cap 14A, and the tip part 15a of the central rod 15 protrudes to the external while the other end thereof is held by the central rod holding member 2.

Furthermore, in the electronic pen 1A of the third embodiment, the two metal pipe parts 11Aa and 11Ab of the casing tubular part 11A of the pen casing 10A operate as power receiving electrodes that form electric field coupling with the power transmitting electrodes of the charging tray of the contactless power transmission system based on electric field coupling through the coupling capacitance Cm.

In the third embodiment, a button operation part 18 for switching between the charging-possible time and the electronic pen operation time is disposed to be exposed to the external from the pen casing 10A. A switch turned on and off through pressing operation of the button operation part 18 is connected to a control circuit of the electronic circuit of the electronic pen 1A.

Figure 10:
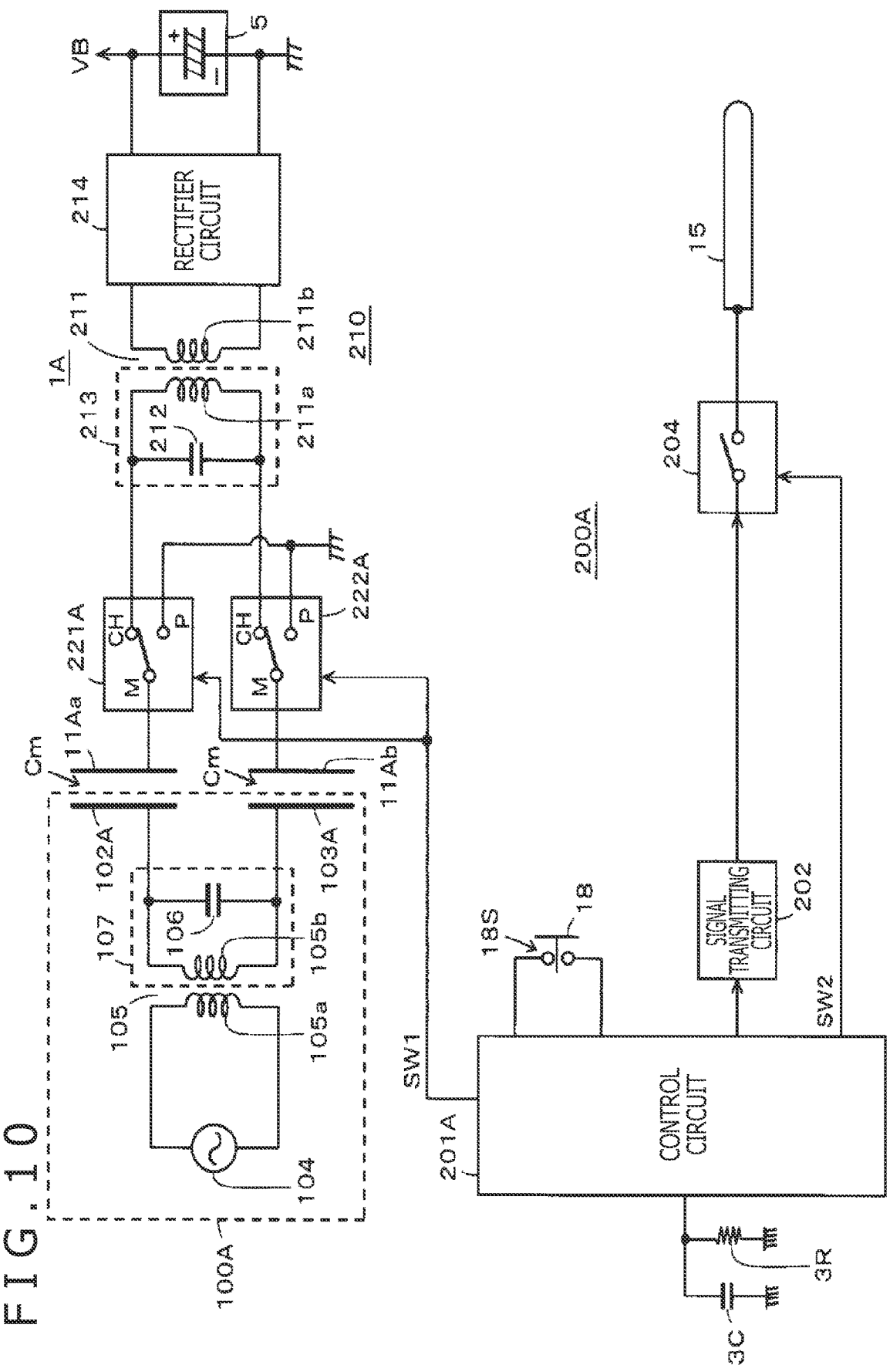
FIG. 10 is a diagram illustrating a circuit example of an electronic circuit of the electronic pen of the third embodiment and an electronic circuit of a charging tray.

Configuration Example of Electronic Circuit of Electronic Pen 1A of Third Embodiment and Electrical Configuration Example of Charging Tray 100A for Electronic Pen 1A Next, a configuration example of the electronic circuit of the electronic pen 1A of the third embodiment is illustrated in FIG. 10 together with an electrical configuration example of a charging tray 100A for the electronic pen. In the charging tray 100A for the electronic pen 1A of the third embodiment, only the setting positions of a power transmitting electrode 102A and a power transmitting electrode 103A are different from the setting positions of the power transmitting electrode 102 and the power transmitting electrode 103 of the charging tray 100 for the electronic pen 1 of the first embodiment, and the other configurations are similar. In the charging tray 100A, a part similar to that of the charging tray 100 is given the same reference symbol as the charging tray 100, and detailed description thereof is omitted. Further, also in the electronic circuit of the electronic pen 1A, a constituent part similar to that of the electronic circuit of the electronic pen 1 of the first embodiment is illustrated with the same reference symbol.

As illustrated in FIG. 10, similarly to the electronic pen 1 of the first embodiment, the electronic circuit of the electronic pen 1A includes an electronic pen circuit 200A, which carries out transfer of signals with the position detecting sensor, and the charging circuit 210 that is configured similarly to the electronic pen 1 of the first embodiment.

Further, the metal pipe part 11Aa and the metal pipe part 11Ab of the casing tubular part 11A of the pen casing 10A are connected to a changeover switch circuit 221A and a changeover switch circuit 222A, respectively, that are each switched to the side of the fixed terminal CH in the charging-possible time and are each switched to the side of the fixed terminal P in the electronic pen operation time.

Also in this example, the electronic pen circuit 200A includes a control circuit 201A configured by the IC placed on the printed board 4 as illustrated in FIG. 10. In the electronic pen circuit 200A, to the control circuit 201A, the signal transmitting circuit 202 and the parallel circuit of the variable-capacitance capacitor 3C configured by the writing pressure detecting unit 3 and the resistor 3R are connected, and a switch 18S turned on and off through pressing operation of the button operation part 18 is connected. Further, the signal output end of the signal transmitting circuit 202 is connected to the central rod 15 through the switch circuit 204 as in the electronic pen 1 of the first embodiment.

In the electronic pen circuit 200A of the electronic pen 1A of the third embodiment, the control circuit 201A switches each of the changeover switch circuits 221A and 222A to the side of the fixed terminal P by the switching control signal SW1 when the button operation part 18 is not pressed down and the switch 18S is in the off-state. Thus, the metal pipe part 11Aa and the metal pipe part 11Ab of the casing tubular part 11A of the pen casing 10A are connected to an earth terminal of the electronic pen circuit 200A. Due to this, the earth electrode of the electronic pen circuit 200A is connected to the ground (electrical earth) through the human body of the user, and the electronic pen 1A carries out stable operation.

Further, the control circuit 201A turns on the switch circuit 204 by the switching control signal SW2 and controls the signal transmitting circuit 202 to transmit a signal for position detection and writing pressure information to the position detecting sensor through the central rod 15.

Moreover, when the button operation part 18 is pressed down and the switch 18S is turned on, the control circuit 201A switches each of the changeover switch circuits 221A and 222A to the side of the fixed terminal CH by the switching control signal SW1. Further, the control circuit 201A turns off the switch circuit 204 by the switching control signal SW2 and does not carry out control of the signal transmitting circuit 202, to reduce wasteful power consumption in the electronic pen circuit 200A.

If the electronic pen 1A is placed to be housed in the hollow 101b of the charging tray 100A for the electronic pen in this state, the power transmitting electrode 102A and the power transmitting electrode 103A of the charging tray 100A for the electronic pen and the metal pipe part 11Aa and the metal pipe part 11Ab of the casing tubular part 11A of the pen casing 10A of the electronic pen 1A form electric field coupling with each other through the coupling capacitance Cm as illustrated in FIG. 10.

Due to this, AC power generated by an AC signal from the AC signal generating circuit 104 of the charging tray 100A is transmitted from the power transmitting electrode 102A and the power transmitting electrode 103A to the metal pipe part 11Aa and the metal pipe part 11Ab as the power receiving electrodes of the electronic pen 1A through the coupling capacitance Cm, and the capacitor 5 is charged in the charging circuit 210.

Also in the electronic pen 1A of the third embodiment, operation and effects similar to those of the electronic pen 1 of the first embodiment are obtained.

In the electronic pen 1A of the above-described third embodiment, the button operation part 18 for switching between the charging-possible time and the electronic pen operation time may be disposed, not on the casing tubular part 11A, but instead on the lid part 16A and be attached in such a manner that pressing operation thereof can be carried out in the axial center direction, as in a knock operation.

Further, in the electronic pen 1A of the above-described third embodiment, switching between the charging-possible time and the electronic pen operation time is carried out through manual operation of the button operation part 18 by the user. However, also in the third embodiment, by making the configuration as follows, switching can automatically be carried out, by monitoring reception of the signal from the position detecting sensor. Specifically, the electronic pen operation time is selected when the signal from the position detecting sensor can be received, and the charging-possible time is selected in other situations in which it is impossible to receive the signal from the position detecting sensor.

Specifically, instead of using the electrically-conductive central rod 15 of the electronic pen 1A exclusively for transmission, a reception mode in which the signal from the position detecting sensor is received is established by the control circuit 201A normally at a predetermined intermittent cycle irrespective of the charging-possible time and the electronic pen operation time. That is, the central rod 15 is switched between the transmission mode and the reception mode in a time-division manner. In the charging-possible time, the transmission mode is not established, and only the intermittent reception mode is established.

Further, when the signal from the position detecting sensor is not received consecutively in plural periods of the reception mode, the control circuit 201A determines that electric field coupling with the position detecting sensor does not exist and that the present situation corresponds to the charging-possible time, and switches each of the changeover switch circuits 221A and 222A to the side of the fixed terminal CH. Moreover, when reception of the signal from the position detecting sensor is detected in a period of the reception mode, the control circuit 201A determines that the present situation is a situation in which electric field coupling with the position detecting sensor exists, and switches each of the changeover switch circuits 221A and 222A to the side of the fixed terminal P and keeps the switched state at least until the next period of the reception mode.

In this way, also in the electronic pen 1A of the third embodiment, the capacitor 5 that is an example of the power storage device can be charged by merely placing and housing the electronic pen 1A in the hollow 101b of the charging tray 100A without providing the button operation part 18.

The configuration of the electronic pen of the third embodiment can also be applied to the configuration of an electronic pen cartridge similarly to the relation between the electronic pen 1 of the first embodiment and the electronic pen cartridge 1CT of the second embodiment.

OTHER EMBODIMENTS

The electronic pen and the electronic pen cartridge of the above-described embodiments are both made into a configuration in which part of the pen casing or the cartridge casing is used as a pair of power receiving electrodes. However, a configuration may be employed in which part of the pen casing or the cartridge casing is used as one of the pair of power receiving electrodes whereas an additional member different from the pen casing and the cartridge casing is used as the other of the pair.

Figure 11:
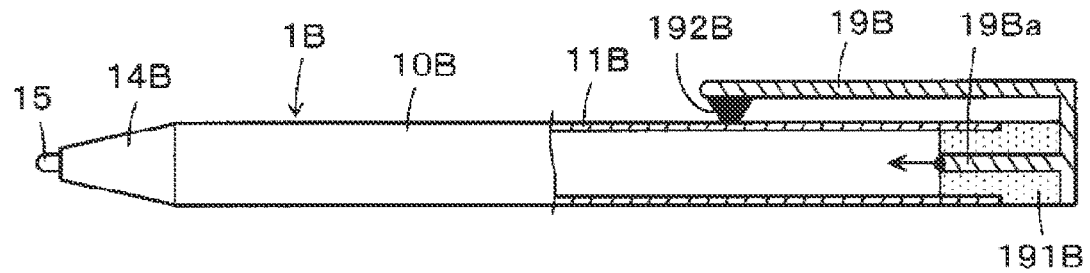
FIG. 11 is a diagram for explaining a configuration example of another embodiment of the electronic pen according to this disclosure.

FIG. 11 is a diagram for explaining a configuration example of an electronic pen 1B having a configuration in which an additional member is used as one of the pair of power receiving electrodes. In the electronic pen 1B of this example of FIG. 11, similarly to the electronic pen 1A of the third embodiment, a pen casing 10B is configured by joining a front cap 14B including a resin to the pen tip side of a casing tubular part 11B including an electrically-conductive metal, and detachably mounting the central rod 15 from an opening of the front cap 14B. While diagrammatic representation is omitted in FIG. 11, also in this example, a button operation part for switching between the charging-possible time and the electronic pen operation time is disposed on the casing tubular part 11B of the pen casing 10B.

Further, in the electronic pen 1B of this example, as an example of the additional member, a clip 19B including an electrically-conductive material, for example, an electrically-conductive metal, is attached to the rear end part of the casing tubular part 11B of the pen casing 10B.

As illustrated in FIG. 11, in this example, an attachment part 191B including an insulating material, for example, a resin, is disposed on the side of the clip 19B attached to the pen casing 10B. Part of the attachment part 191B is inserted and fitted into the inside of the pen casing 10B from an opening of the pen casing 10B, and thereby the clip 19B is attached to the rear end side of the casing tubular part 11B of the pen casing 10B.

Moreover, an insulating member 192B illustrated as a black region in FIG. 11 is attached to a part that gets contact with the pen casing 10B at the end part of the clip 19B on the side opposite to the attachment part 191B. Alternatively, electrical insulation between the clip 19B and the casing tubular part 11B may be achieved by, for example, coating the part that gets contact with the clip 19B in the casing tubular part 11B with an insulator, instead of providing the insulating member 192B at the end part of the clip 19B.

Figure 12:
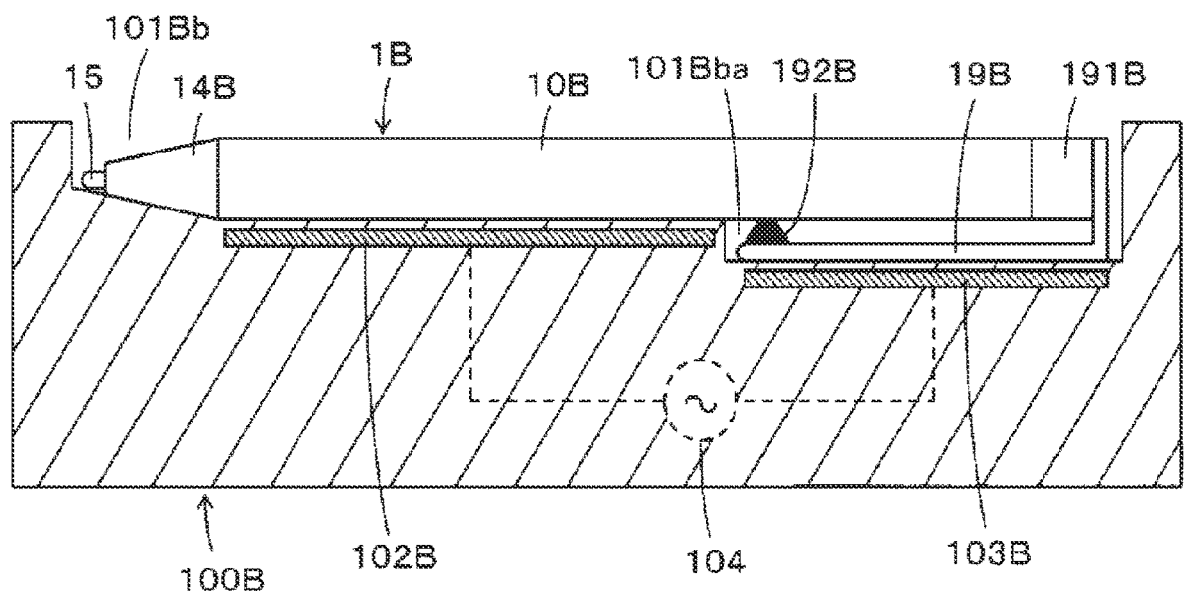
FIG. 12 is a diagram for explaining a configuration example of a charging tray for the other embodiment of the electronic pen according to this disclosure.

Based on the above configuration, in the electronic pen 1B of this example of FIG. 11, the casing tubular part 11B and the clip 19B electrically insulated from each other form power receiving electrodes that make electric field coupling with power transmitting electrodes of a charging tray 100B (see FIG. 12).

In this case, as illustrated in FIG. 11, the clip 19B has a terminal part 19Ba that penetrates the attachment part 191B and that has a tip part exposed to the inside of a hollow part of the casing tubular part 11B, and the terminal part 19Ba is connected to the charging circuit 210. Further, similarly to the third embodiment, the casing tubular part 11B is connected to the charging circuit 210 through a changeover switch circuit that is switched between the fixed terminal CH and the fixed terminal P in the charging-possible time and the electronic pen operation time. In this example, the fixed terminal P of the changeover switch circuit is connected to the earth terminal of the electronic pen circuit 200 as in the above-described first embodiment.

Moreover, the charging tray 100B for the electronic pen 1B in this example is configured as illustrated in FIG. 12. Specifically, the basic configuration of the charging tray 100B is similar to that of the charging tray 100 for the electronic pen 1 of the first embodiment described with reference to FIGS. 4A and 4B. However, the shape of a hollow 101Bb in which the electronic pen 1B is placed and housed and the disposition of power transmitting electrodes 102B and 103B are different from those in the case of the charging tray 100.

Specifically, the hollow 101Bb of the charging tray 100B is made into a shape having a step hollow part 101Bba that houses the clip 19B when the electronic pen 1B is placed to be housed in the hollow 101Bb with the clip 19B set on the lower side. In this case, the depth of the step hollow part 101Bba is selected to be equal to the separation distance between the casing tubular part 11B and the clip 19B.

Further, as illustrated in FIG. 12, the power transmitting electrode 103B that contactlessly forms electric field coupling with the clip 19B is disposed under the step hollow part 101Bba of the charging tray 100B. Moreover, under the part excluding the step hollow part 101Bba in the hollow 101Bb, the power transmitting electrode 102B that forms electric field coupling with the casing tubular part 11B of the electronic pen 1B to be located at this part is disposed.

The configuration of the electronic circuit in the case of the electronic pen 1B of this example is the same as what is obtained by, in the circuit illustrated in FIG. 10, replacing the metal pipe part 11Aa of the casing tubular part 11A with the casing tubular part 11B, replacing the metal pipe part 11Ab with the clip 19B, and making a configuration in which the clip 19B is connected to the charging circuit 210 without providing the changeover switch circuit 222A.

Also in the electronic pen 1B of this example of FIG. 11, operation and effects similar to those of the electronic pen 1 of the first embodiment and the electronic pen 1A of the third embodiment are obtained.

Figure 13:
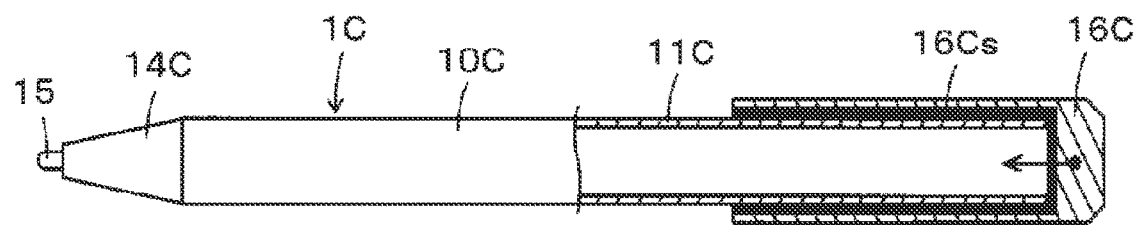
FIG. 13 is a diagram for explaining a configuration example of further another embodiment of the electronic pen according to this disclosure.

FIG. 13 is a diagram for explaining a configuration example of an electronic pen 1C of another example in which a power receiving electrode is formed by an additional member. Also in the electronic pen 1C of this example of FIG. 13, similarly to the electronic pen 1A of the third embodiment, a pen casing 10C is configured by joining a front cap 14C including a resin to the pen tip side of a casing tubular part 11C including an electrically-conductive metal, and detachably mounting the central rod 15 from an opening of the front cap 14C. Further, also in the example of FIG. 13, a button operation part for switching between the charging-possible time and the electronic pen operation time is disposed on the casing tubular part 11C of the pen casing 10C while diagrammatic representation is omitted.

Moreover, in the electronic pen 1C of this example of FIG. 13, a lid part 16C that closes an opening of the casing tubular part 11C on the rear end side is made into a cap shape that covers the rear end side of the casing tubular part 11C over a predetermined length. In this example, the lid part 16C includes an electrically-conductive metal. In addition, an insulating layer 16Cs is applied on an inner wall surface of a recessed hole in which the casing tubular part 11C is inserted in the lid part 16C as illustrated as a black region in FIG. 13. Due to the insulating layer 16Cs, the casing tubular part 11C and the lid part 16C are electrically insulated from each other when the lid part 16C is attached to the casing tubular part 11C.

Further, in this example, the lid part 16C penetrates the insulating layer 16Cs and is connected to the charging circuit 210 in a hollow part of the casing tubular part 11C as illustrated in FIG. 13. In addition, as in the third embodiment, the casing tubular part 11C is connected to the charging circuit 210 through a changeover switch circuit that is switched between the fixed terminal CH and the fixed terminal P in the charging-possible time and the electronic pen operation time. In this example, the fixed terminal P of the changeover switch circuit is connected to the earth terminal of the electronic pen circuit 200 as in the above-described first embodiment.

Moreover, a charging tray for the electronic pen 1C of this example can be made into a configuration similar to that of the charging tray 100B for the electronic pen 1B illustrated in FIG. 12 while diagrammatic representation is omitted. However, in the charging tray for the electronic pen 1C, the shape of the step hollow part 101Bba of the hollow 101Bb of the charging tray 100B is modified to a shape corresponding to a circumferential side surface of the lid part 16C. In addition, the length and the depth of the step hollow part 101Bba are set to the length and the thickness of the part of the casing tubular part 11C covered by the lid part 16C. Furthermore, respective power transmitting electrodes are disposed so as to contactlessly form electric field coupling with the casing tubular part 11C and the lid part 16C.

The configuration of the electronic circuit in the case of the electronic pen 1C of this example is made into a configuration similar to that described regarding the electronic pen 1B of the example of FIG. 11 by replacing the clip 19B with the lid part 16C.

Also in the electronic pen 1C of this example of FIG. 13, operation and effects similar to those of the electronic pen 1 of the first embodiment and the electronic pen 1A of the third embodiment are obtained.

OTHER EMBODIMENTS AND MODIFICATION EXAMPLES

Figure 14:
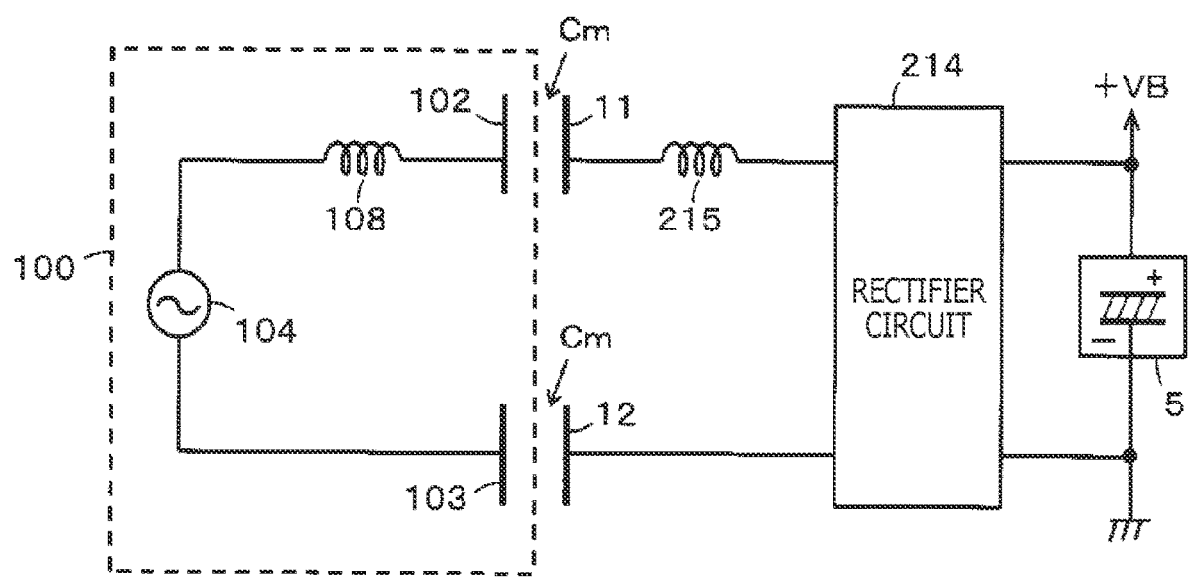
FIG. 14 is a diagram for explaining another circuit example of a power transmission system based on electric field coupling.

In the embodiments described above, the configuration of a circuit of the parallel resonant type is used as the power transmission circuit system of the electric field coupling system between the electronic pen and the charging tray. However, it is also possible to employ a configuration of a circuit of the series resonant type, like that illustrated in FIG. 14. The circuit example of FIG. 14 is the case in which a power transmission circuit system of an electric field coupling system using the circuit of the series resonant type is applied to the case of the electronic pen 1 and the charging tray 100 in the first embodiment. In this case, an inductance 108 and an inductance 215 are connected in series to the coupling capacitance Cm between the power receiving electrodes 11 and 12 of the electronic pen 1 and the power transmitting electrodes 102 and 103 of the charging tray 100.

What is claimed is:

1. An electronic pen of a capacitive system, comprising:
   a tubular pen casing;
   an electronic circuit including a signal transmitting circuit that generates a signal to be supplied to a position detecting sensor, the electronic circuit disposed in the tubular pen casing;
   a power storage device that provides a supply voltage to the electronic circuit and is capable of being charged, the power storage device disposed in the tubular pen casing; and
   a first conductor part and a second conductor part that are disposed to be exposed to outside to contactlessly form electric field coupling with power transmitting electrodes of a power transmitting part of an external charging device, the first and second conductor parts being operable as power receiving electrodes, wherein
   the electronic circuit includes a charging circuit which, responsive to being connected to the first conductor part and the second conductor part, allows charging of the power storage device, and
   at least one of the first conductor part or the second conductor part forms part of the pen casing.

2. The electronic pen of a capacitive system according to claim 1, further comprising:
   a rod-shaped center electrode that has a tip protruding to the outside from an opening of the pen casing on a pen tip side as one side in an axial center direction and that forms electric field coupling with the position detecting sensor; and
   a peripheral electrode disposed to surround the center electrode in a state of being electrically insulated from the center electrode, wherein the pen casing includes a tubular part on a pen-tip side configured by an electrically-conductive member, to which the peripheral electrode is attached via interposition of an insulating member, and the tubular part configured by the electrically-conductive member is used as one of the first conductor part and the second conductor part, and the peripheral electrode is used as the other of the first conductor part and the second conductor part.

3. The electronic pen of a capacitive system according to claim 2, wherein the tubular part configured by the electrically-conductive member is connected to a first changeover circuit that is switched between a state of being connected to the charging circuit and a state of being connected to a ground terminal of the electronic circuit.

4. The electronic pen of a capacitive system according to claim 3, further comprising:
   a user operable element exposed from an outer circumferential surface of the pen casing, wherein
   the first changeover circuit is switched in response to operation of the user operable element.

5. The electronic pen of a capacitive system according to claim 3, wherein
   the peripheral electrode functions as a receiving part that receives a signal from the position detecting sensor, and
   the first changeover circuit switches the conductor part of the pen casing to the state of being connected to the ground terminal of the electronic circuit when the electronic pen is in a state in which a signal from the position detecting sensor is received by the peripheral electrode.

6. The electronic pen of a capacitive system according to claim 2, wherein the peripheral electrode is connected to a second changeover circuit that is switched between a state of being connected to the charging circuit and a state of being connected to an output end of a signal from the signal transmitting circuit of the electronic circuit or an input end of a received signal from the position detecting sensor.

7. The electronic pen of a capacitive system according to claim 6, further comprising:
   a user operable element exposed from an outer circumferential surface of the pen casing, wherein
   the second changeover circuit is switched in response to operation of the user operable element.

8. The electronic pen of a capacitive system according to claim 6, wherein
   the peripheral electrode functions as a receiving part that receives a signal from the position detecting sensor, and
   the second changeover circuit switches the peripheral electrode to the state of being connected to the charging circuit when the electronic pen is in a state in which a signal from the position detecting sensor is not received by the peripheral electrode.

9. The electronic pen of a capacitive system according to claim 1, wherein
   the pen casing includes a tubular casing part in which two tubular parts each configured by an electrically-conductive member are joined to each other with interposition of an insulating member,
   the two tubular parts operate as the first conductor part and the second conductor part, and
   at least one of the two tubular parts is connected to a changeover circuit that is switched between a state of being connected to the charging circuit and a state of being connected to a ground terminal of the electronic circuit.

10. The electronic pen of a capacitive system according to claim 9, further comprising:
    a user operable element, wherein
    the changeover circuit is switched in response to operation of the user operable element.

11. The electronic pen of a capacitive system according to claim 1, wherein
    the pen casing includes a tubular part formed of an electrically-conductive member that configures one of the first conductor part and the second conductor part, and
    for the pen casing, an additional member formed of an electrically-conductive member is provided to form the other of the first conductor part and the second conductor part, wherein the additional member is insulated from the tubular part.

12. The electronic pen of a capacitive system according to claim 11, wherein the additional member is a clip.

13. The electronic pen of a capacitive system according to claim 11, wherein the additional member is a member that closes an opening of the pen casing on a rear end side opposite to the pen tip side.

14. The electronic pen of a capacitive system according to claim 1, wherein the power storage device is a capacitor.

15. The electronic pen of a capacitive system according to claim 1, wherein the electronic pen uses a circuit of a series resonant type as a transmission circuit system of an electric field coupling system for coupling with the power transmitting part.

16. The electronic pen of a capacitive system according to claim 1, wherein the electronic pen uses a circuit of a parallel resonant type as a transmission circuit system of an electric field coupling system for coupling with the power transmitting part.

17. An electronic pen cartridge of a capacitive system detachably housed in a tubular pen casing of an electronic pen in a state in which at least a pen tip is capable of protruding from an opening of the pen casing on one side in an axial center direction, the electronic pen cartridge comprising:
    a tubular cartridge casing;
    an electronic circuit that includes a signal transmitting circuit configured to generate a signal to be supplied to a position detecting sensor, the electronic circuit disposed in the tubular cartridge casing;
    a power storage device that provides a supply voltage to the electronic circuit and is capable of being charged, the power storage device disposed in the tubular cartridge casing;
    a first conductor part and a second conductor part that are disposed to be exposed to outside to contactlessly form electric field coupling with power transmitting electrodes of a power transmitting part of an external charging device, the first and second conductor parts being operable as power receiving electrodes, wherein
    the electronic circuit includes a charging circuit which, responsive to being connected to the first conductor part and the second conductor part, allows charging of the power storage device, and
    at least one of the first conductor part or the second conductor part forms part of the cartridge casing.

18. A charging tray for an electronic pen that is an electronic pen of a capacitive system, in which an electronic circuit including a signal transmitting circuit that generates a signal to be supplied to a position detecting sensor is disposed in a tubular pen casing and in which a power storage device that provides a supply voltage to the electronic circuit and is capable of being charged is disposed in the tubular pen casing, the electronic pen including a first conductor part and a second conductor part that are disposed to be exposed to outside to contactlessly form electric field coupling with power transmitting electrodes of a power transmitting part of an external charging device and to operate as power receiving electrodes, the electronic circuit including a charging circuit which, responsive to being connected to the first conductor part and the second conductor part, allows charging of the power storage device, and at least one of the first conductor part or the second conductor part forming part of the pen casing, wherein the charging tray comprises:

a surface having a hollow that is configured to lock the electronic pen placed in the hollow and is longer than a length of the pen casing of the electronic pen in an axial center direction;

a first power transmitting electrode and a second power transmitting electrode that form the electric field coupling with the first conductor part and the second conductor part of the electronic pen that is placed in the hollow and is locked; and a transmitting power supply that generates power to be transmitted through the first power transmitting electrode and the second power transmitting electrode.

19. A charging tray for an electronic pen cartridge that is an electronic pen cartridge of a capacitive system detachably housed in a tubular pen casing of an electronic pen in a state in which at least a pen tip is capable of protruding from an opening of the pen casing on one side in an axial center direction, the electronic pen cartridge including a tubular cartridge casing which houses an electronic circuit, which includes a signal transmitting circuit configured to generate a signal to be supplied to a position detecting sensor, and a power storage device, which provides a supply voltage to the electronic circuit and is chargeable, the electronic pen cartridge including a first conductor part and a second conductor part that are disposed to be exposed to outside to contactlessly form electric field coupling with power transmitting electrodes of a power transmitting part of an external charging device and to operate as power receiving electrodes, the electronic circuit including a charging circuit which, responsive to being connected to the first conductor part and the second conductor part, allows charging of the power storage device, and at least one of the first conductor part or the second conductor part forming part of the cartridge casing, wherein the charging tray comprises:

a surface having a hollow that is configured to lock the electronic pen cartridge placed in the hollow and is longer than a length of the cartridge casing of the electronic pen cartridge in the axial center direction;

a first power transmitting electrode and a second power transmitting electrode that form the electric field coupling with the first conductor part and the second conductor part of the electronic pen cartridge that is placed in the hollow and is locked; and a transmitting power supply that generates power to be transmitted through the first power transmitting electrode and the second power transmitting electrode.

\* \* \* \* \*